United States Patent
Sun et al.

(10) Patent No.: US 12,485,898 B1
(45) Date of Patent: Dec. 2, 2025

(54) ONLINE LANE ESTIMATION AND TRACKING IN AUTONOMOUS VEHICLE AND DRIVING ASSISTANCE APPLICATIONS

(71) Applicant: Waymo LLC, Mountain View, CA (US)

(72) Inventors: Guan Sun, Sunnyvale, CA (US); Yue Shen, Mountain View, CA (US); Martin Nikoltchev, Oakland, CA (US); Pengchong Jin, Mountain View, CA (US); Yi Shen, Sunnyvale, CA (US); Jiyang Gao, Foster City, CA (US)

(73) Assignee: Waymo LLC, Mountain View, CA (US)

( * ) Notice: Subject to any disclaimer, the term of this patent is extended or adjusted under 35 U.S.C. 154(b) by 118 days.

(21) Appl. No.: 17/976,384

(22) Filed: Oct. 28, 2022

Related U.S. Application Data

(60) Provisional application No. 63/274,862, filed on Nov. 2, 2021.

(51) Int. Cl.
*B60W 30/18* (2012.01)
*G06N 20/20* (2019.01)

(52) U.S. Cl.
CPC ....... *B60W 30/18163* (2013.01); *G06N 20/20* (2019.01); *B60W 2552/10* (2020.02); *B60W 2552/53* (2020.02); *B60W 2554/40* (2020.02); *B60W 2556/40* (2020.02)

(58) Field of Classification Search
CPC ....... B60W 30/18163; B60W 2552/10; B60W 2552/53; B60W 2554/40; B60W 2556/40; G06N 20/20
See application file for complete search history.

(56) References Cited

U.S. PATENT DOCUMENTS

| | | |
|---|---|---|
| 2017/0010613 A1 | 1/2017 | Fukumoto |
| 2017/0010618 A1 | 1/2017 | Shashua et al. |
| 2017/0043768 A1 | 2/2017 | Prokhorov |
| 2018/0268359 A1 | 9/2018 | Soubhagya |
| 2019/0039613 A1* | 2/2019 | Lee .......... G08G 1/167 |

(Continued)

OTHER PUBLICATIONS

Homayounfar et al., "Dagmapper: Learning to map by discovering lane topology", In Proceedings of the IEEE/CVF International Conference on Computer Vision (pp. 2911-2920), 2019.

(Continued)

*Primary Examiner* — Sahar Motazedi
(74) *Attorney, Agent, or Firm* — Lowenstein Sandler LLP

(57) ABSTRACT

The described aspects and implementations enable online lane estimation and tracking in autonomous vehicle and driver assistance applications. In one implementation, disclosed is a method and a system to perform the method that includes receiving perception data indicative of driving lanes and reference objects in a driving environment of a vehicle, identifying target destinations corresponding to the driving lanes, determining candidate driving paths connecting a starting location with one of the target destinations, selecting a target driving path from the candidate driving paths based on geometric properties of each candidate driving path and a spatial relationship of a respective candidate driving path to the reference objects, and causing a motion of the vehicle to be modified based on the target driving path.

21 Claims, 10 Drawing Sheets

(56) References Cited

U.S. PATENT DOCUMENTS

| | | |
|---|---|---|
| 2019/0130736 A1 | 5/2019 | Silver et al. |
| 2020/0026224 A1 | 1/2020 | Mori et al. |
| 2020/0089245 A1* | 3/2020 | Yadmellat .......... G01C 21/3407 |
| 2020/0166360 A1 | 5/2020 | Jaganathan |
| 2020/0192351 A1 | 6/2020 | Rastoll et al. |
| 2020/0192391 A1* | 6/2020 | Vora ..................... G05D 1/0214 |
| 2020/0331476 A1* | 10/2020 | Chen .................... G05D 1/0088 |
| 2021/0046923 A1 | 2/2021 | Olson et al. |
| 2021/0109536 A1* | 4/2021 | Oh ....................... G05D 1/0214 |
| 2021/0201051 A1* | 7/2021 | Deselaers ................ G06N 7/01 |
| 2021/0331670 A1* | 10/2021 | Valchok ............. G01C 21/3658 |
| 2021/0402992 A1* | 12/2021 | Morimoto ............. B60W 30/12 |
| 2022/0017112 A1 | 1/2022 | Liu et al. |
| 2022/0026224 A1* | 1/2022 | Zhao .................... G05D 1/0219 |
| 2022/0048535 A1* | 2/2022 | Niendorf .............. G01C 21/165 |
| 2022/0063657 A1* | 3/2022 | Kashu ............... B60W 60/0055 |
| 2022/0063663 A1* | 3/2022 | Wolff ................ B60W 60/0027 |
| 2022/0105963 A1 | 4/2022 | Costa et al. |
| 2022/0234618 A1* | 7/2022 | Kabzan ............. B60W 60/0013 |
| 2022/0297718 A1* | 9/2022 | Yu ....................... B60W 60/001 |
| 2022/0410929 A1 | 12/2022 | Kim |
| 2023/0303115 A1* | 9/2023 | Tominaga ................ G08G 1/16 |

OTHER PUBLICATIONS

Iomayounfar et al., "Hierarchical Recurrent Attention Networks for Structured Online Maps," In IEEE/CVF Conference on Computer Vision and Pattern Recognition, Jun. 18-23, 2018.

* cited by examiner

ONLINE LANE ESTIMATION AND TRACKING IN AUTONOMOUS VEHICLE AND DRIVING ASSISTANCE APPLICATIONS

RELATED APPLICATIONS

This application claims the benefit of U.S. Provisional Application No. 63/274,862, filed Nov. 2, 2021, the entire contents of which is being incorporated herein by reference.

TECHNICAL FIELD

The instant specification generally relates to autonomous vehicles. More specifically, the instant specification relates to improving autonomous driving systems and components by estimating and tracking lanes in a driving environment.

BACKGROUND

An autonomous (fully and partially self-driving) vehicle (AV) operates by sensing an outside environment with various electromagnetic (e.g., radar and optical) and non-electromagnetic (e.g., audio and humidity) sensors. Some autonomous vehicles chart a driving path through the environment based on the sensed data. The driving path can be determined based on Global Positioning System (GPS) data and road map data. While the GPS and the road map data can provide information about static aspects of the environment (buildings, street layouts, road closures, etc.), dynamic information (such as information about other vehicles, pedestrians, street lights, etc.) is obtained from contemporaneously collected sensing data. Precision and safety of the driving path and of the speed regime selected by the autonomous vehicle depend on timely and accurate identification of various objects present in the driving environment and on the ability of a driving algorithm to process the information about the environment and to provide correct instructions to the vehicle controls and the drivetrain.

BRIEF DESCRIPTION OF THE DRAWINGS

The present disclosure is illustrated by way of examples, and not by way of limitation, and can be more fully understood with references to the following detailed description when considered in connection with the figures, in which.

SUMMARY

Figure 1:
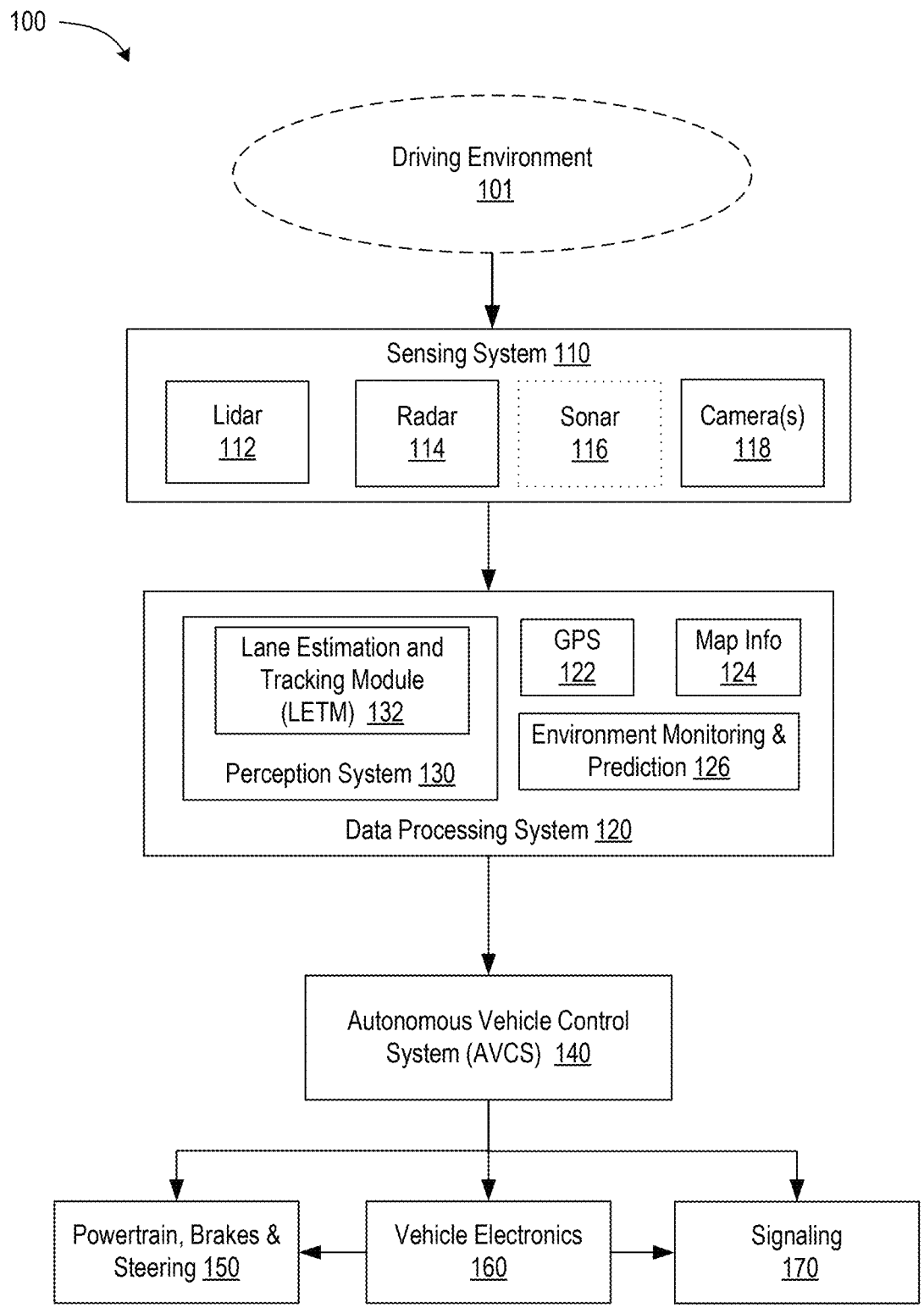
FIG. 1 is a diagram illustrating components of an example autonomous vehicle (AV) capable of performing lane estimation and tracking procedures, in accordance with some implementations of the present disclosure.

In one implementation, disclosed is a method that includes receiving, by a processing device, a perception data from a sensing system of a vehicle, the perception data indicative of one or more driving lanes and one or more reference objects in a driving environment of the vehicle. The method further includes identifying, by the processing device, one or more target destinations, each of the one or more target destinations corresponding to one of the one or more driving lanes. The method further includes determining, by the processing device, a plurality of candidate driving paths, wherein each candidate driving path of the plurality of candidate driving paths connects a starting location in a starting driving lane of the one or more driving lanes with one of the one or more target destinations. The method further includes selecting, by the processing device, a target driving path from the plurality of candidate driving paths based on geometric properties of each candidate driving path of the plurality of candidate driving paths and a spatial relationship of a respective candidate driving path to the one or more reference objects. The method further includes causing, by the processing device, a motion of the vehicle to be modified based on the target driving path.

In another implementation, disclosed is a system that includes a sending system configured to obtain a perception data indicative of one or more driving lanes and one or more reference objects in a driving environment of the vehicle. The system further includes a data processing system configured to identify one or more target destinations, each of the one or more target destinations corresponding to one of the one or more driving lanes. The data processing system is further configured to determine a plurality of candidate driving paths, wherein each candidate driving path of the plurality of candidate driving paths connects a starting location in a starting driving lane of the one or more driving lanes with one of the one or more target destinations. The data processing system is further configured to select a target driving path from the plurality of candidate driving paths based on geometric properties of each candidate driving path of the plurality of candidate driving paths and a spatial relationship of a respective candidate driving path to the one or more reference objects, and cause a motion of the vehicle to be modified based on the target driving path.

In another implementation, disclosed is a non-transitory computer-readable storage medium storing instructions that, when executed by a processing device, cause the processing device to perform operations that include receiving a perception data from a sensing system of a vehicle, the perception data indicative of one or more driving lanes and one or more reference objects in a driving environment of the vehicle. Operations further include identifying one or more target destinations, each of the one or more target destinations corresponding to one of the one or more driving lanes. Operations further include determining a plurality of candidate driving paths, wherein each candidate driving path of the plurality of candidate driving paths connects a starting location in a starting driving lane of the one or more driving lanes with one of the one or more target destinations. Operations further include selecting a target driving path from the plurality of candidate driving paths based on geometric properties of each candidate driving path of the plurality of candidate driving paths and a spatial relationship of a respective candidate driving path to the one or more reference objects, and causing a motion of the vehicle to be modified based on the target driving path.

DETAILED DESCRIPTION

An autonomous vehicle (AV) makes numerous decisions and performs many actions when navigating through a driving environment. AVs often depend on accurate perceptions of drivable lane boundaries to make determinations that affect operational decision-making. For example, an AV can store map data indicating a disposition of one or more drivable lanes in an environment of the AV. Map data may indicate previously measured and/or determined boundaries of the one or more drivable lanes. However, various conditions of the drivable lanes may render the previously stored map data (e.g., previously perceived and/or inferred lane boundaries) inadequate in representing a current state of the drivable lanes. For example, the drivable lane boundaries may incorrectly depict the current lane boundaries of the driving environment. Failure of an AV to accurately perceive current lane boundaries may result in uninformed decision-making associated with the navigation of the AV.

Common scenarios where drivable lane boundaries may not match previously measured lane data occur on both freeways and surface streets. For example, some scenarios may include repainting of lane markers, temporary lane closures, altered lane conditions, among other things. Commonly seen scenarios on freeways may include lane closures and lane shifts. Various lane conditions may be indicated by one or more perceivable objects. For example, a lane closure often includes a lane merge at the start and a lane split at the end of the closure. Lane closures are often surrounded by construction objects, such as cones and/or signs. For lane shift cases, the shift often happens for one or more parallel lanes traveling in a generally parallel direction. The lane shift may be represented by new lane markers, signs, and/or temporary cones. To successfully navigate through such scenarios, an AV needs to perceive changes to a state of one or more drivable lanes quickly and accurately and formulate an updated representation of the drivable lane. For example, the drivable lane may include the current lane an AV is currently occupying as well as other drivable lanes proximate the AV (e.g., within a threshold region or distance from the AV). In some implementations, multiple lanes are perceived and used by the AV to better predict the behavior of other agents (e.g., cars, pedestrians, etc.) in the driving environment.

Aspects and implementations of the present disclosure address these and other shortcomings of the existing lane estimation and tracking technology by enabling methods and systems that reliably and quickly identify lane conditions (e.g., lane geometry and topology) and update one or more perceived drivable lane boundaries based on the detected lane conditions. For example, the methods and systems may use road primitives (e.g., cones, signs, lane markers) detected by multiple sensors of the sensing system (e.g., radio detection and ranging (RADAR) sensors, light detection and ranging (LIDAR) sensors, cameras, sound navigation and ranging (SONAR) sensors, and the like) to track lanes over time and/or estimate current road topology and geometry (e.g., of a driving environment surrounding an AV). In some implementations, methods and/or systems described herein may be performed onboard an AV. For example, an AV may include the one or systems and devices to perform one or more of the methods presented herein in a live driving environment (e.g., in real time).

A perception system of the AV may identify multiple driving lanes present in the driving environment of the AV (e.g., area within a predetermined proximity to the AV). Some of the identified driving lanes may be for the same direction as the AV is traveling while other driving lanes may be going in the opposite direction. The perception system may be capable of determining (e.g., using high-resolution lidar data) a configuration of driving lanes at relatively short distances (e.g., 50 to 100 meters) and may further perceive (e.g., using camera data) that a certain number of lanes are present at large distances (e.g., above 200 or 300 meters). The driving lanes perceived at large distances may represent target destinations to which the driving lanes identified at short distances may eventually connect. At intermediate distances, however, the driving lanes can shift, merge, split, end, and start again. To facilitate determining how the lane configuration (geometry) evolves with the distance from the AV, various implementations of the present disclosure describe a lane estimation and tracking system that continuously updates driving lane center lines and/or boundaries based on detected objects within an environment of an AV. This enables the AV to remain in a correct lane as well to predict behavior of other agents in the environment, such as vehicles, pedestrians, and so on.

The lane estimation and tracking system determines lane conditions from detected road primitives (e.g., cones, signs, lane markers, etc.) and detected environment context (e.g. stationary and moving objects around the AV, including vehicles). For example, the detected road primitives may be encoded into a feature vector indicative of an environment proximate to an AV (e.g., a perception region within a threshold distance from the AV). The determined lane conditions can be leveraged to select a target destination from a set of target destinations corresponding to locations of driving lanes at large distances. The lane estimation and tracking system may determine a set of candidate driving paths connecting a current lane driven by the AV with various target destinations of driving lanes at large distances. The lane estimation and tracking system may evaluate each of the candidate driving paths based on geometric properties of the respective path (e.g., favoring paths with smaller curvature) and relation to identified objects (e.g., favoring paths that do not intersect cones, barriers, road signs, temporary lane markers, etc.). The lane estimation and tracking system may select one or more target driving paths based on the evaluation of multiple candidate driving paths. In some implementations, path selection may also be based on a confidence score determined by lane estimation and/or tracking model(s).

FIG. 1 is a diagram illustrating components of an example autonomous vehicle (AV) 100 capable of performing lane estimation and tracking procedures, in accordance with some implementations of the present disclosure.

Autonomous vehicles can include passenger and commercial motor vehicles (cars, trucks, buses, motorcycles, all-terrain vehicles, recreational vehicles, any specialized farming or construction vehicles, and the like), aircraft (planes, helicopters, drones, and the like), naval vehicles (ships, boats, yachts, submarines, and the like), or any other self-propelled vehicles (e.g., robots, factory or warehouse robotic vehicles, sidewalk delivery robotic vehicles, etc.) capable of being operated in a self-driving mode (without a human input or with a reduced human input).

Vehicles, such as those described herein, may be configured to operate in one or more different driving modes. For instance, in a manual driving mode, a driver may directly control acceleration, deceleration, and steering via inputs such as an accelerator pedal, a brake pedal, a steering wheel, etc. A vehicle may also operate in one or more autonomous driving modes including, for example, a semi or partially autonomous driving mode in which a person exercises some amount of direct or remote control over driving operations, or a fully autonomous driving mode in which the vehicle handles the driving operations without direct or remote control by a person. These vehicles may be known by different names including, for example, autonomously driven vehicles, self-driving vehicles, and so on.

The U.S. National Highway Traffic Safety Administration (NHTSA) and the Society of Automotive Engineers (SAE) have each defined different levels of automated driving to indicate how much, or how little, a vehicle controls the driving, although different organizations may categorize the levels differently.

As described herein, in a semi or partially autonomous driving mode, even though the vehicle assists with one or more driving operations (e.g., steering, braking and/or accelerating to perform lane centering, adaptive cruise control, advanced driver assistance systems (ADAS), or emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

Although, for brevity and conciseness, various systems and methods are described below in conjunction with autonomous vehicles, similar techniques can be used in various driver assistance systems that do not rise to the level of fully autonomous driving systems. More specifically, disclosed techniques can be used in Level 2 driver assistance systems that implement steering, braking, acceleration, lane centering, adaptive cruise control, etc., as well as other driver support. The disclosed techniques can be used in Level 3 driving assistance systems capable of autonomous driving under limited (e.g., highway) conditions. Likewise, the disclosed techniques can be used in vehicles that use Level 4 self-driving systems that operate autonomously under most regular driving situations and require only occasional attention of the human operator. In all such systems, accurate lane estimation can be performed automatically without a driver input or control (e.g., while the vehicle is in motion) and result in improved reliability of vehicle positioning and navigation and the overall safety of autonomous, semi-autonomous, and other driver assistance systems.

A driving environment 101 can include any objects (animated or non-animated) located outside the AV, such as roadways, buildings, trees, bushes, sidewalks, bridges, mountains, other vehicles, pedestrians, and so on. The driving environment 101 can be urban, suburban, rural, and so on. In some implementations, the driving environment 101 can be an off-road environment (e.g. farming or other agricultural land). In some implementations, the driving environment can be an indoor environment, e.g., the environment of an industrial plant, a shipping warehouse, a hazardous area of a building, and so on. In some implementations, the driving environment 101 can be substantially flat, with various objects moving parallel to a surface (e.g., parallel to the surface of Earth). In other implementations, the driving environment can be three-dimensional and can include objects that are capable of moving along all three directions (e.g., balloons, leaves, etc.). Hereinafter, the term "driving environment" should be understood to include all environments in which an autonomous motion of self-propelled vehicles can occur. For example, "driving environment" can include any possible flying environment of an aircraft or a marine environment of a naval vessel. The objects of the driving environment 101 can be located at any distance from the AV, from close distances of several feet (or less) to several miles (or more).

The example AV 100 can include a sensing system 110. The sensing system 110 can include various electromagnetic (e.g., optical) and non-electromagnetic (e.g., acoustic) sensing subsystems and/or devices. The sensing system 110 can include a radar 114 (or multiple radars 114), which can be any system that utilizes radio or microwave frequency signals to sense objects within the driving environment 101 of the AV 100. The radar(s) 114 can be configured to sense both the spatial locations of the objects (including their spatial dimensions) and velocities of the objects (e.g., using the Doppler shift technology). Hereinafter, "velocity" refers to both how fast the object is moving (the speed of the object) as well as the direction of the object's motion. The sensing system 110 can include a lidar 112, which can be a laser-based unit capable of determining distances to the objects and velocities of the objects in the driving environment 101. Each of the lidar 112 and radar 114 can include a coherent sensor, such as a frequency-modulated continuous-wave (FMCW) lidar or radar sensor. For example, radar 114 can use heterodyne detection for velocity determination. In some implementations, the functionality of a ToF and coherent radar is combined into a radar unit capable of simultaneously determining both the distance to and the radial velocity of the reflecting object. Such a unit can be configured to operate in an incoherent sensing mode (ToF mode) and/or a coherent sensing mode (e.g., a mode that uses heterodyne detection) or both modes at the same time. In some implementations, multiple radars 114 and/or lidars 112 can be mounted on AV 100.

Radar 114 can include one or more radio/microwave sources producing and emitting signals and one or more detectors of the signals reflected back from the objects. In some implementations, radar 114 (or multiple radars 114) can perform a 360-degree scanning in a horizontal direction. In some implementations, radar(s) 114 can be capable of spatial scanning along both the horizontal and vertical directions. In some implementations, the field of view can be up to 90 degrees in the vertical direction (e.g., with at least a part of the region above the horizon being scanned with radar signals). In some implementations, the field of view can be a full sphere (consisting of two hemispheres).

The sensing system 110 can further include one or more cameras 118 to capture images of the driving environment 101. The images can be two-dimensional projections of the driving environment 101 (or parts of the driving environment 101) onto a projecting surface (flat or non-flat) of the camera(s). Some of the cameras 118 of the sensing system 110 can be video cameras configured to capture a continuous (or quasi-continuous) stream of images of the driving environment 101. The sensing system 110 can also include one or more sonars 116, which can be ultrasonic sonars, in some implementations.

The sensing data obtained by the sensing system 110 can be processed by a data processing system 120 of AV 100. For example, the data processing system 120 can include a perception system 130. The perception system 130 can be configured to detect and track objects in the driving environment 101 and to recognize the detected objects. For example, the perception system 130 can analyze images captured by the cameras 118 and can be capable of detecting traffic light signals, road signs, roadway layouts (e.g., boundaries of traffic lanes, topologies of intersections, designations of parking places, and so on), presence of obstacles, and the like. The perception system 130 can further receive radar sensing data (Doppler data and ToF data) to determine distances to various objects in the environment 101 and velocities (radial and, in some implementations, transverse, as described below) of such objects. In some implementations, the perception system 130 can use radar data in combination with the data captured by the camera(s) 118, as described in more detail below.

The perception system 130 can include one or more modules to facilitate lane estimation and tracking, including a lane estimation and tracking module (LETM) 132 that can be used to process data provided by the sensing system 110, including images from camera(s) 118, radar data (both processed return points and low-level semantic data) from radar 114, and lidar data from lidar 112. LETM 132 can include one or more trained models that are used to process some or all of the above data to predict one or more of lane boundaries, lane states (e.g., accessibility of a lane, blockage of a lane, upcoming changes to a lane, etc.), and/or lane identification (ID) (e.g., data labels). In some implementations, LETM 132 can further provide confidence levels representing estimates of the reliability of the output predictions. Various models of LETM 132 can be trained using multiple annotated camera images, multiple sets of radar data and/or lidar data (e.g., including road primitive measurements such as cones, signs, lane markers, etc.), to identify one or more of lane boundaries, lane states, and/or lane IDs associated with measured driving environment(s).

The perception system 130 can further receive information from a positioning subsystem (not shown in FIG. 1), which can include a GPS transceiver (not shown), configured to obtain information about the position of the AV relative to Earth and its surroundings. The positioning subsystem can use the positioning data, (e.g., GPS and IMU data) in conjunction with the sensing data to help accurately determine the location of the AV with respect to fixed objects of the driving environment 101 (e.g. roadways, lane boundaries, intersections, sidewalks, crosswalks, road signs, curbs, surrounding buildings, etc.) whose locations can be provided by map information 124. In some implementations, the data processing system 120 can receive non-electromagnetic data, such as audio data (e.g., ultrasonic sensor data, or data from a mic picking up emergency vehicle sirens), temperature sensor data, humidity sensor data, pressure sensor data, meteorological data (e.g., wind speed and direction, precipitation data), and the like.

The data processing system 120 can further include an environment monitoring and prediction component 126, which can monitor how the driving environment 101 evolves with time, e.g., by keeping track of the locations and velocities of the animated objects (e.g., relative to Earth). In some implementations, the environment monitoring and prediction component 126 can keep track of the changing appearance of the environment due to a motion of the AV relative to the environment. In some implementations, the environment monitoring and prediction component 126 can make predictions about how various animated objects of the driving environment 101 will be positioned within a prediction time horizon. The predictions can be based on the current locations and velocities of the animated objects as well as on the tracked dynamics of the animated objects during a certain (e.g., predetermined) period of time. For example, based on stored data for object 1 indicating accelerated motion of object 1 during the previous 3-second period of time, the environment monitoring and prediction component 126 can conclude that object 1 is resuming its motion from a stop sign or a red traffic light signal. Accordingly, the environment monitoring and prediction component 126 can predict, given the layout of the roadway and presence of other vehicles, where object 1 is likely to be within the next 3 or 5 seconds of motion. As another example, based on stored data for object 2 indicating decelerated motion of object 2 during the previous 2-second period of time, the environment monitoring and prediction component 126 can conclude that object 2 is stopping at a stop sign or at a red traffic light signal. Accordingly, the environment monitoring and prediction component 126 can predict where object 2 is likely to be within the next 1 or 3 seconds. The environment monitoring and prediction component 126 can perform periodic checks of the accuracy of its predictions and modify the predictions based on new data obtained from the sensing system 110. The environment monitoring and prediction component 126 can operate in conjunction with LETM 132. Although not depicted explicitly in FIG. 1, in some implementations, LETM 132 can be integrated into the environment monitoring and prediction component 126.

The data generated by the perception system 130, the GPS data processing module 122, and the environment monitoring and prediction component 126 can be used by an autonomous driving system, such as AV control system (AVCS) 140. The AVCS 140 can include one or more algorithms that control how AV is to behave in various driving situations and environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles. The LETM 132 can further output data indicative of the behavior of other objects (e.g., vehicles) on the road.

Algorithms and modules of AVCS 140 can generate instructions for various systems and components of the vehicle, such as the powertrain, brakes, and steering 150, vehicle electronics 160, signaling 170, and other systems and components not explicitly shown in FIG. 1. The powertrain, brakes, and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain, brakes, and steering 150 (or signaling 170) whereas other instructions output by the AVCS 140 are first delivered to the vehicle electronics 160, which generates commands to the powertrain, brakes, and steering 150 and/or signaling 170.

In one example, camera 118, radar 114, and/or lidar 112 can determine that the path ahead (e.g., a current driving lane) is hindered by one or more road primitives (e.g., cones or traffic signs). The AVCS 140 can cause the AV 100 to alter a driving path (e.g., change lanes) based on the detected one or more road primitives (e.g., identifying a spatial relationship between the road primitives, detecting displayed navigational instructions associated with the road primitives). The data processing system 120 can determine the status of a lane (e.g., temporary lane closure) based on the detection of the one or more road primitives. Using the determination made by the data processing system 120, the AVCS 140 can output instructions to powertrain, brakes and steering 150 to route the AV through a temporary travel path (e.g., a detour) and return the AV to an original driving path after determining the status of the associated lane has returned to a previous state (e.g., a normal or active lane state). Additionally, or alternatively, in the same example, LETM 134 can determine that a candidate object (e.g., road primitive) is disposed in a drivable lane associated with a current location of the AV. Based on this determination, the AVCS 140 can output instructions to the powertrain, brakes and steering 150 to drive around the candidate object. The LETM 132 may provide data used to predict the behavior of objects (e.g., vehicles, pedestrians, etc.) in the driving environment of the AV. The AVCS 140 may alter driving behavior of the AV responsive to data indicating future states of objects within the driving environments. The LETM 132 may detect a construction zone and detect that an oncoming lane shifts or merges into the current lane of the AV. The LETM 132 may communicate to the AV to choose to yield or nudge accordingly based on the object detection (e.g., oncoming vehicles). For example, LETM 132 may determine that a two-way road with two lanes in each direction has a construction zone in which the oncoming traffic lanes are closed and one of the lanes of traffic in the direction of the AV's motion is provided for the oncoming traffic. LETM 132 can determine that the left lane currently occupied by the AV is to be used by oncoming traffic within a certain driving distance. Using the output of LETM 132, the AVCS 140 can alter a driving path of the AV by causing the AV to move to the right lane.

Figure 2:
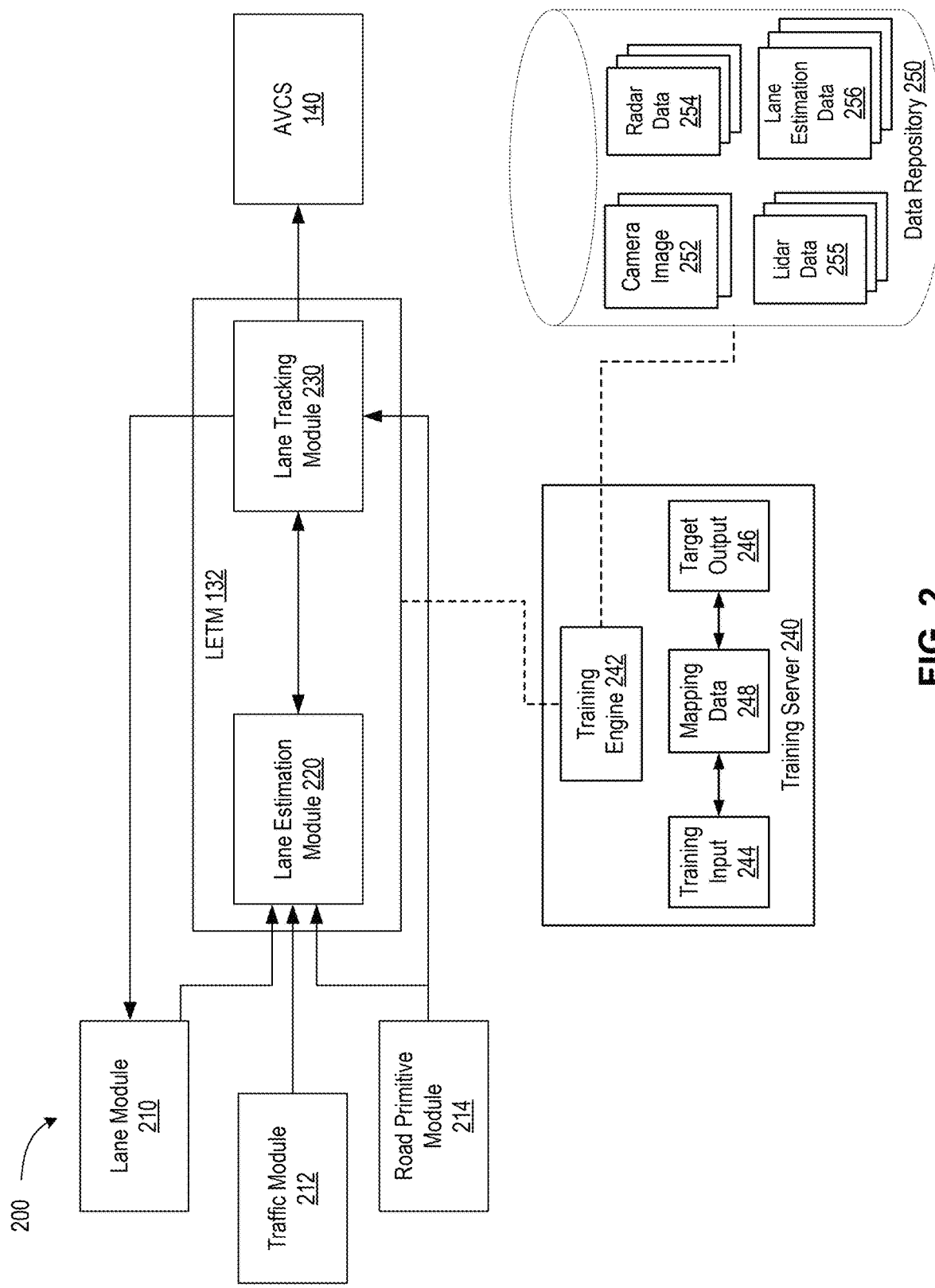
FIG. 2 is a diagram illustrating example architecture of a part of a perception system of a vehicle that is capable of lane estimation and tracking, in accordance with some implementations of the present disclosure.

FIG. 2 is a diagram illustrating example architecture 200 of a part of a perception system of a vehicle that is capable of lane estimation and tracking, in accordance with some implementations of the present disclosure. The example architecture 200 may include aspects and features of AV 100 such as LETM 132. An input into the perception system (e.g., perception system 130 of FIG. 1) can include data obtained by sensing system 110 (e.g., radar 114 and camera 118), such as distance data, radial velocity data, camera pixel data, etc. For example, sensing system 110 may provide input to one or more of the lane module 210, the traffic module 212, and/or the road primitive module 214.

The lane module 210 may maintain a current mapping of driving lanes to a current driving environment. The lane module 210 may obtain the current mapping of driving lanes from mapping data (e.g., stored onboard the AV). The current mapping of driving lanes may indicate identification data (e.g., labeling of the lanes, ID of the lanes, etc.) and/or a state of each lane. The state of each lane may include one or more of geometric, semantic, and/or topological data associated with each lane. For example, geometric data may include parts of a sequence of lane center waypoint coordinates, center-to-boundary widths, headings, curvatures, among other things. Semantic data may include information like speed limit, associated traffic controls, among other things. A waypoint, as used herein, may include a location (or point) of a candidate driving path (e.g., a target path or potential travel path of an AV). A waypoint may include a splitting point, merging point, turning point, among other things of a driving path. Topological data may include potential lane merge/split points and associated likelihoods of merge/splits occurring. In some implementations, lane module 210 may receive sensing data (e.g., from sensing system 110) that indicates relocation of an AV to a new environment. For example, the lane module 210 may retrieve mapping data (e.g. map info 124) associated with the new environment and update a current mapping of driving lanes based on the retrieved mapping data. In some implementations, the lane module 210 may receive location data (e.g., from GPS 122) and update the current mapping of driving lanes in association with the received location data. For example, lane module 210 may retrieve updated mapping data (e.g., map info 124) based on the location data (e.g., indicating relocation of the AV to a new environment). In some implementations, the lane module 210 may include data of a current position of an AV (e.g., a current lane of the AV) within the mapping of the driving lanes. As will be discussed further, lane module 210 may receive updated lane data from lane tracking module 230 and may update the mapping of the driving lanes based on the received updated lane data.

Traffic module 212 may receive sensing data (e.g. from sensing system 110), as described above. The traffic module 212 may perform object detection to identify one or more objects associated with a flow of traffic within a driving environment. Traffic module 212 may identify a location and/or relative motion of objects associated with the flow of traffic. For example, traffic module 212 may track a relative motion of one or more vehicles disposed within the driving environment. In another example, traffic module 212 may determine that a vehicle moved from an old driving lane to a new driving lane within the driving environment. In another example, the traffic module 212 may determine a density of vehicles disposed within the driving environment, including distance between vehicles, average and maximum speed of traffic, and the like.

Road primitive module 214 may receive sensing data (e.g., from sensing system 110), as described above. The road primitive module 214 may perform object detection to identify road primitives (e.g., cones, signs, lane markers, and other objects). In some implementations, road primitives may be determined by fusing sensing data from multiple sources. For example, road primitives may be detected using any combination of radar, lidar, sonar, and/or camera images.

In some implementations, as will be discussed further in connection with other implementations, one or more of lane module 210, traffic module 212, and/or road primitive module 214 may include a feature extractor. The feature extractor may receive sensing data and generate data associated with various combinations, correlations, and/or artificial parameters. The feature extractor can dimensionally reduce the sensing data into groups or features. For example, the feature extractor may generate features that include one or more road primitives, lane states, and traffic flow parameters. In some implementations, the feature extractor performs any of partial least squares analysis, principal component analysis, multifactor dimensionality reduction, nonlinear dimensionality reduction, and/or any combination thereof. In some implementations, the feature extractor is designed for edge detection of the sensing data. For example, the feature extractor includes methodology that aims at identifying sensor data and/or image data that changes sharply and/or that include discontinuities (e.g., the boundaries of one or more road primitives).

In some implementations, the feature extractor may make use of a graphical neural network (GNN). The GNN may include a family of models that handle relations between sparse objects in space. Within the GNN, data from the lane module 210, the traffic module 212, and/or road primitive module may include objects encoded into feature vectors. The GNN may employ model relations using attention-based interactions.

In some implementations, the GNN may leverage map annotations in the form of splines (e.g., lanes), closed shapes (e.g., regions of intersections) and points (e.g., traffic lights), with additional attribute information such as semantic labels of the annotations and their current state (e.g., color of the traffic light, speed limit of the road). Trajectories of moving agents may be in the form of directed splines that depend on time. All such elements may be approximated as sequences of vectors. For example, for map annotations, the feature extractor may select a starting point and direction and uniformly sample key points from the splines at a common spatial distance, and sequentially connect the neighboring key points into vectors that make up a vector set. In another example, for trajectories, the feature extractor can sample key points with a common temporal interval (e.g., 0.1 second), starting from t=0, and connect the sampled key points to form vectors that make up a vector set. Given small enough spatial or temporal intervals, the resulting polylines serve as close approximations of the original map and trajectories.

Vectorization may include a one-to-one mapping between continuous trajectories, map annotations and the vector set(s) previously described. The feature extractor may form a graph representation based on the vector set (e.g., encoded by graph neural networks). For example, each vector $v_i$ belonging to a polyline $P_j$ as a node in the graph with node feature may be represented as:

$$v_i = [d_i^s, d_i^e, a_i, j],$$

where $d_i^s$ and $d_i^e$ are coordinates of the start and end points of the vector; $a_i$ corresponds to attribute features, such as object type, timestamps for trajectories, or road feature type or speed limit for lanes; j is an identifier (e.g., the integer identifier) of $P_j$, indicating $v_i \in P_j$. In some representations, d itself can be represented as for two-dimensional (2D) coordinates (x,y) or for three-dimensional (3D) coordinates (x,y,z).

In some implementations (e.g., to exploit the spatial and semantic locality of the nodes), the feature extractor may employ a hierarchical approach by constructing subgraphs at the vector level, where all vector nodes belonging to the same polyline are connected with each other. For example, considering a polyline P with its nodes $\{v_1, v_2, \ldots, v_p\}$, a single layer of a subgraph may be represented as $$v_i^{(l+1)} = \phi_{rel}\left(g_{enc}(v_i^{(l)}), \phi_{agg}(\{g_{enc}(v_j^{(l)})\})\right)$$

where $v_i^{(l)}$ is a node feature for the l-th layer of the subgraph network, and $v_i^{(0)}$ is the input feature $v_i$. Function $g_{enc}(\bullet)$ transforms the individual nodes features, function $\phi_{agg}(\bullet)$ aggregates the information from all neighboring nodes, and function $\phi_{rel}(\bullet)$ is a relational operator between node $v_i$ and its neighbors.

In some implementations, $g_{enc}(\bullet)$ is a multi-layer perceptron (MLP) whose weights are shared over all nodes. For example, the MLP may include a single fully-connected layer followed by a normalization layer. In another example, $\phi_{agg}(\bullet)$ may include a maximum pooling operation and $\phi_{rel}(\bullet)$ may include a simple concatenation.

In some implementations, the feature extractor may optimize multi-task training objective of the hierarchical graph network using $$L=L_{traj}+\alpha L_{node}$$

where $L_{traj}$ is a negative Gaussian log-likelihood for ground truth future trajectories, $L_{node}$ is a loss function (e.g., Huber loss) between predicted node features and ground masked node features.

The LETM 132 may include a lane estimation module 220 and a lane tracking module 230. The lane estimation module 220 can process outputs of lane module 210, traffic module 212, and road primitive module 214. The data provided to the lane estimation module 220 can correspond to mapping of driving lanes, states of driving lanes, traffic flow data, and/or road primitive data, among other things. In some implementations, the input to the lane estimation module 220 may include one or more feature vectors generated by a feature extractor, as previously described. The input data can be processed by the lane estimation module 220, which may include one or more machine learning models (MLMs). The lane estimation module 220 can estimate (and re-estimate) and predict candidate driving paths (sometimes referred to herein as connected drivable lane proposals).

Figure 4:
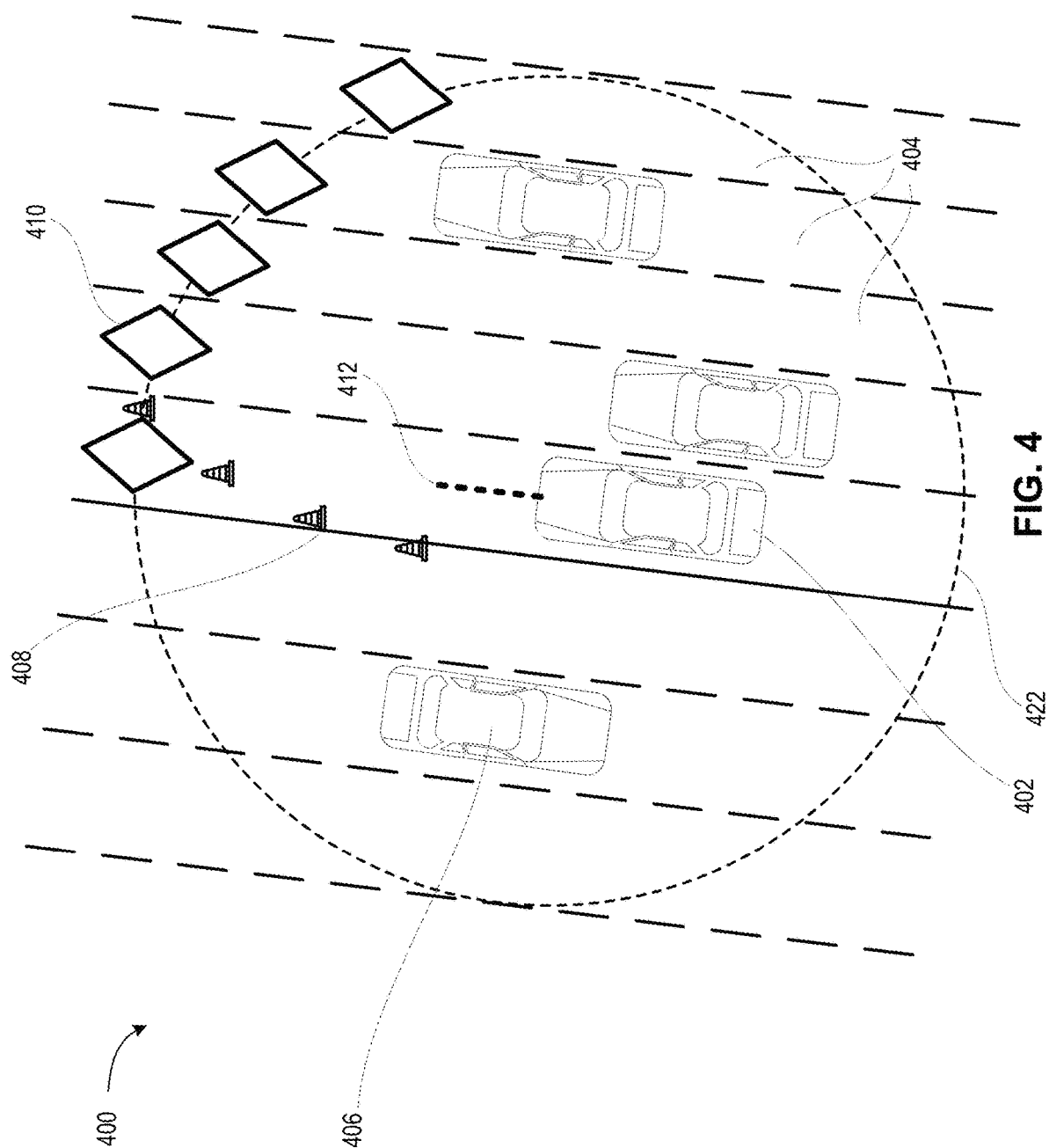
FIG. 4 is a schematic illustration of a perceived driving environment processed using a target prediction module, in accordance with some implementations of the present disclosure.

Candidate driving paths may include connected paths from a reference location (e.g., a current location/lane of an AV) to a target location (a future reference location of a lane). For example, as shown in FIG. 4 (described in greater detail later), target destinations 410 may be positioned at an edge of a perception region 422. The target location may be associated with a projected location one or more lanes a distance (e.g., down the road from) from a reference location (e.g., a current location 402). A candidate driving path may include one or more lane waypoints based on the mapping of the driving lane, the traffic flow, the state of one or more lanes, and/or road primitive measurement. A lane waypoint may be a location on a driving path. For example, a lane waypoint may include a merging location of two lanes, a splitting location of a first lane into multiple lanes, a turn (e.g., a curve) that alters an immediate travel direction of the driving path at the lane waypoint, among other things. For example, if a lane is forked into two lanes at some point of the roadway, the lane estimation module 220 may output two different candidate driving paths each corresponding to one of the forked paths. (See FIG. 7A) In another example, if a lane is closed at some point, and/or merging with a neighboring lane, the output may depict a shifted lane that is gradually overlapping with the neighboring lane. Further discussion will be provided related to the candidate driving paths (e.g., and associated lane waypoints) in later implementations (e.g., FIG. 7A-C).

Lane estimation module 220 may determine a probability that the predicted lane waypoints of a candidate driving path are representative of the current driving lanes with the associated lane states. MLMs deployed by lane estimation module 220 can include decision-tree algorithms, support vector machines, deep neural networks, graph neural networks (GNN) and the like. Deep neural networks can include convolutional neural networks, recurrent neural networks (RNN) with one or more hidden layers, fully connected neural networks, long short-term memory neural networks, Boltzmann machines, neural networks with attention, transformer neural networks, and so on. In some implementations, the lane estimation module 220 includes a searching model that includes processing logic that searches in space for all the possible connected lanes and/or paths of a current lane track.

Figure 6:
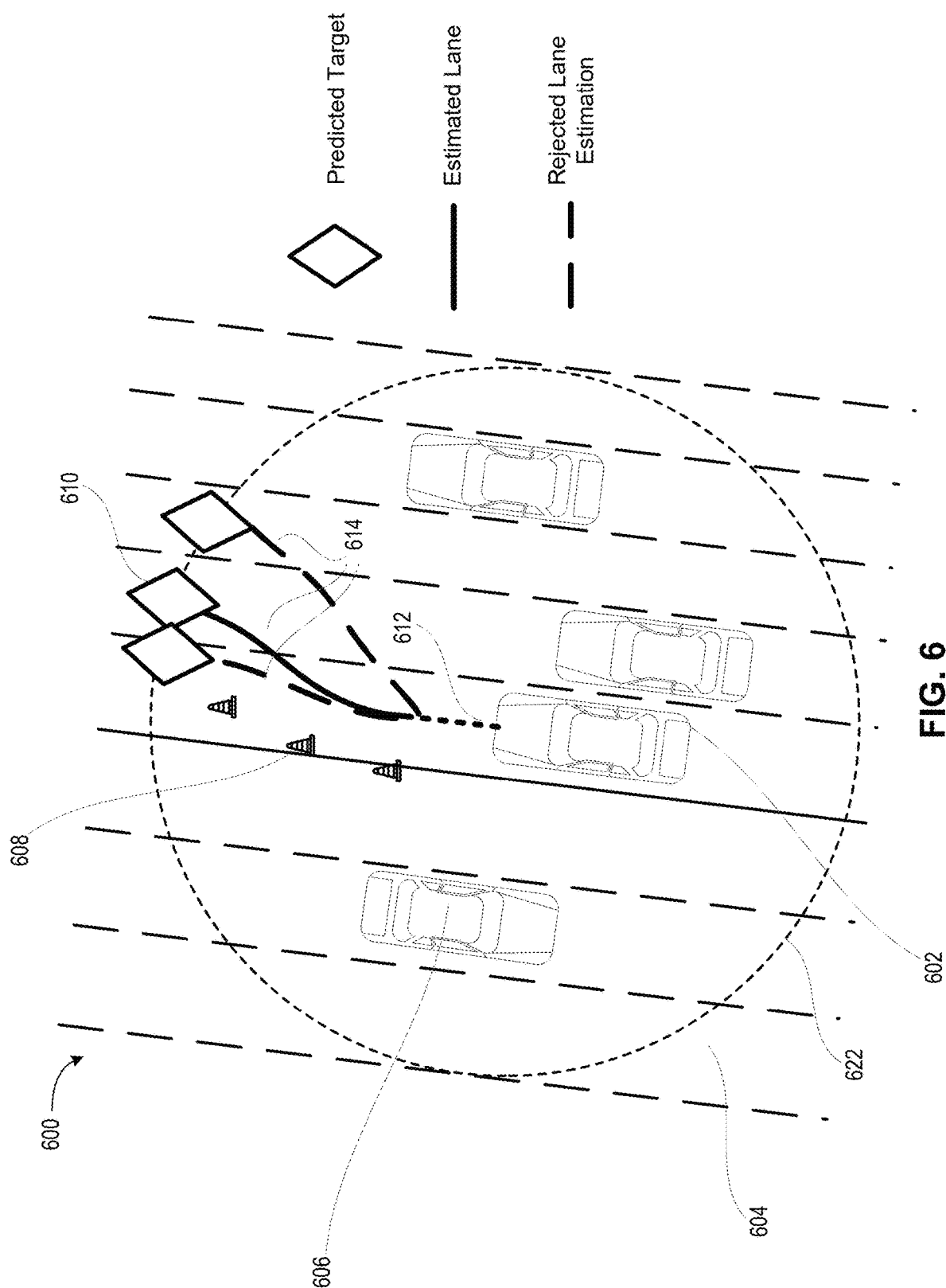
FIG. 6 is a schematic illustration of a perceived driving environment processed using a lane metric module, in accordance with some implementations of the present disclosure.

Lane estimation module 220 can also receive road primitive data from road primitive module 214. Lane tracking module 220 processing multiple lane estimations (e.g., predicted lane waypoints or connected drivable lane proposals). For example, lane tracking module 220 may determine a metric (e.g., score, level of confidence, level of accuracy) associated with one or more lane estimations. In another example, as seen in FIG. 6, multiple candidate driving paths 614 may be identified and evaluated based on geometric properties of the perceived driving lanes 604. One or more of the candidate driving paths 614 may be rejected and a target driving path may be selected as meeting a threshold metric (e.g., the highest score).

The LETM 132 can also include lane tracking module 230 that can receive lane waypoint predictions from lane estimation module 220. The lane tracking module 230 may send updated lane perception data to the lane module 210 indicating an updated mapping of driving lanes to a driving environment. In some implementations, the lane tracking module 230 may include a threshold distance (e.g., a minimum distance) associated with an update condition of the one or more connectable drivable lane proposals. The update condition may indicate a restriction on updating the one or more drivable lane proposals based on the threshold distance. The lane tracking module 230 may input a constraint into the lane estimation module 220 to provide outputs with drivable lane proposals that take effect at distances exceeding the threshold distances. As a result, the lane tracking module 230 may be prevented from generating lane proposals that call for abrupt and/or unsafe driving maneuvers. In some implementations, the threshold distance is based on a current velocity of the AV, e.g., with the threshold distance increasing with the velocity of the AV. In some implementations, the threshold distance may provide increased stability in the travel path of the AV and provide the lane estimation module 220 and/or lane tracking module 230 adequate time to process and provide outputs to the AVCS 140. The lane tracking module 230 may include aspects and/or features as will be discussed further in association with FIGS. 3A-B.

Lane tracking data generated by lane tracking module 230 can be provided to AVCS 140. AVCS 140 evaluates the candidate driving paths (e.g., connected drivable lane proposals) being tracked and determines whether to modify the current driving trajectory of the AV (e.g., to follow a candidate driving path that meets a threshold condition (a selected target candidate driving path). For example, if a tracked driving path indicates a merging of a current lane to a neighboring lane based on road primitive data, the AVCS 140 can slow the AV down to a speed that ensures that the car can be safely merge into the neighboring lane, direct the car to change lanes in anticipation of the merge, if the adjacent lane is free from obstructions, and/or perform some other driving maneuver.

LETM 132 can be trained using actual camera images, radar data, lidar data, and lane estimation data that have been annotated with ground truth, which can include correct identification of driving lanes, traffic flow, and/or road primitives, e.g., based on a human input and/or lidar-based identification. Training can be performed by a training engine 242 hosted by a training server 240, which can be an outside server that deploys one or more processing devices, e.g., central processing units (CPUs), graphics processing units (GPUs), etc. In some implementations, one or more models of LETM 132 can be trained by training engine 242 and subsequently downloaded onto the perception system 130 of the AV 100. LETM 132, as illustrated in FIG. 2, can be trained using training data that includes training inputs 244 and corresponding target outputs 246 (correct matches for the respective training inputs). During training of LETM 132, training engine 242 can find patterns in the training data that map each training input 244 to the target output 246.

Training engine 242 can have access to a data repository 250 storing multiple camera images 252, instances of radar data 254, instances of lidar data 255, and corresponding lane estimation data 256 (e.g., candidate driving paths) for actual driving situations in a variety of environments. During training, training engine 242 can select (e.g., randomly), as training data, a number of camera images 252, sets of radar data 254, sets of lidar data 255, and lane estimation data 256 corresponding to the selected number of camera images 252, sets of lidar data 255, and sets of radar data 254. Training data can be annotated with correct lane states (e.g., boundaries, waypoints, and/or geometric, semantic, and/or topological features). In some implementations, annotations can be made by a developer before the annotated data is placed into data repository 250. Annotated training data retrieved by training server 240 from data repository 250 can include one or more training inputs 244 and one or more target outputs 246. Training data can also include mapping data 248 that maps training inputs 244 to the target outputs 246. In some implementations, mapping data 248 can identify one or more driving lanes associated with road primitive data (e.g., determined from a camera image and/or radar data). The mapping data 248 can include an identifier of the training data, location of a detected object, size of the object, speed and direction of motion of the object, type of the object, and other suitable information. In some implementations, training can be performed using mapping data that is unannotated. More specifically, training engine 242 can include object identification processing (e.g., neural network-based object identification), which can use machine-learning models trained in object identification. For example, training camera images can be input into object identification processing to determine 1) states of one or more driving lanes depicted in the camera image, 2) road primitives depicted in the camera image, or 3) estimate of candidate driving paths. The training camera images annotated with the outputs of the object identification processing can then be used as ground truth in training of LETM 132.

During training of LETM 132, training engine 242 can change parameters (e.g., weights and biases) of various models of LETM 132 until the models successfully learn how to predict correct lane estimations (target outputs 246). In some implementations, different models of LETM 132 (e.g., data encoder, prediction module, lane estimation module, and lane metric module associated with FIG. 3A) can be trained separately. In some implementations, various models of LETM 132 can be trained together (e.g., concurrently). Different models can have different architectures (e.g., different numbers of neuron layers and different topologies of neural connections) and can have different settings (e.g., activation functions, classifiers, etc.).

The data repository 250 can be a persistent storage capable of storing radar data, camera images, as well as data structures configured to facilitate accurate and fast validation of radar detections, in accordance with implementations of the present disclosure. The data repository 250 can be hosted by one or more storage devices, such as main memory, magnetic or optical storage based disks, tapes or hard drives, NAS, SAN, and so forth. Although depicted as separate from training server 240, in an implementation, the data repository 250 can be a part of training server 240. In some implementations, data repository 250 can be a network-attached file server, while in other implementations, data repository 250 can be some other type of persistent storage such as an object-oriented database, a relational database, and so forth, that can be hosted by a server machine or one or more different machines accessible to the training server 240 via a network (not shown in FIG. 2).

Figure 3A:
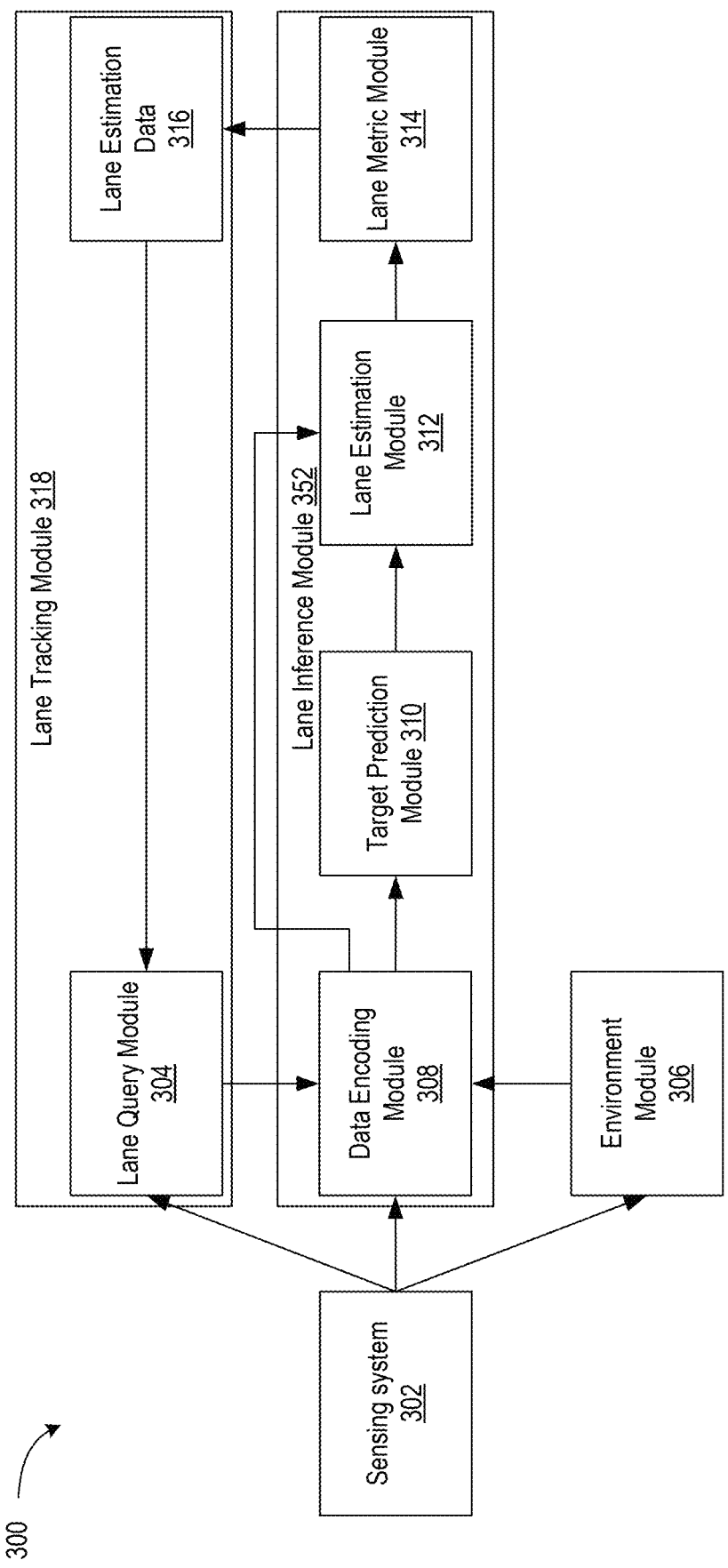
FIG. 3A is a block diagram that illustrates a lane estimation and tracking system in which implementations of the disclosure may operate.

FIG. 3A is a block diagram that illustrates a lane estimation and tracking system 300 in which implementations of the disclosure may operate. The lane estimation and tracking system 300 may include a sensing system 302 (e.g., sensing system 110 of FIG. 1). The sensing system 302 may include sensors such as radar, lidar, and/or cameras, as previously described. The sensing system 110 can provide lane query module 304 of a lane tracking module 318, environment module 306, and data encoding module 308 with sensor data indicating a state of a driving environment. For example, sensor data may include images indicative of a state of an environment of an AV.

The lane query module 304 may receive sensor data from sensing system 302. In some implementations, the lane query module 304 may receive location data and/or map data associated with a driving environment. The lane query module 304 may determine a current mapping of driving lanes to a current driving environment based on the received input data. For example, as will be discussed further in connection with FIG. 4, a current mapping of perception region 422 may include one or more driving lanes 404. The lane query module 304 may obtain the current mapping of driving lanes from mapping data (e.g., stored onboard the AV). The current mapping of driving lanes may include identification data (e.g., labeling of the lanes, ID of the lanes, etc.) and/or a state of each lane. The state of each lane may include one or more of geometric, semantic, and/or topological data associated with each lane. For example, geometric data may include parts of a sequence of lane center waypoint coordinates, center-to-boundary widths, headings, curvatures, and the like. Semantic data may include such information as speed limit, associated traffic controls, and the like. Topological data may include potential lane merge/split points and associated likelihood (e.g., identifying features such objects (e.g., road primitives), traffic flows (e.g., orientation of one or vehicles) that may indicate an upcoming merge and/or a split of an associated lane). In some implementations, lane query module 304 may receive sensing data (e.g., from sensing system 110) that indicates relocation of an AV to a new environment. For example, the lane query module 304 may retrieve mapping data (e.g. map info 124) associated with the new environment and update current mapping of driving lanes to be based on the retrieved mapping data. In some implementations, the lane query module 304 may receive location data (e.g., from GPS 122) and update the current mapping of driving lanes in association with the received location data. For example, lane query module 304 may retrieve updated mapping data (e.g., map info 124) based on the location data (e.g., indicating relocation of the AV to a new environment). In some implementations, the lane query module 304 may include data of a current position of an AV within the mapping of the driving lanes. As will be discussed further, lane query module 304 may receive lane estimation data 316 from lane metric module 314 and may update the mapping of the driving lanes of the lane tracking module 318 based on the received updated lane data. The lane query module 304 may send current lane state data and mapping to the data encoding module 308.

Environment module 306 may receive sensing data from sensing system 302. Environment module 306 may include processing logic that detects environment objects such as road primitives within the received sensor data. Road primitives may include one or more objects indicating a state of one or more driving lanes. For example, a road primitive may include a cone, a sign, lane marker, etc. Environment module 306 may determine associations between one or more determined road primitive measurements. For example, road primitives detected in close proximity (e.g., a line of cones or lane markers) may be associated together. Environment module 306 may determine changes to lane configuration of one or more driving lanes of a driving environment based on determined associations between road primitives. The environment module 306 may output environment data indicating the one or more road primitives and/or lane configurations to the data encoding module 306. For example, as will be discussed further in connection with FIG. 4, road primitives 408 may be detected within a perception region 422 and included in the previously described environment data.

As shown in FIG. 3A, the lane estimation and tracking system 300 includes a lane inference module 352. The lane inference module 352 may include a data encoding module 308, a target prediction module 310, a lane estimation module 312, and/or a lane metric module 314.

The lane mapping data and environment data may be received by data encoding module 308 (e.g., from lane query module 304 and environment module 306). In some implementations, the data encoding module 308 receives one or more additional sensor data from sensing system 302. The data encoding module 308 may receive the above described input data and generate synthetic data associated with various combinations, correlations, and/or artificial parameters. The data encoding module 308 may dimensionality reduce the received input data into groups or features. For example, the data encoding module 308 may generate features that include one or more road primitive measurement and/or lane states. In some implementations, data encoding module 308 performs any of the partial least squares analysis, principal component analysis, multifactor dimensionality reduction, nonlinear dimensionality reduction, and/or any combination thereof. In some implementations, the data encoding module 308 is designed for edge detection of the received input data. For example, the data encoding module 308 implements a methodology that identifies abrupt sensor data and/or image data changes and/or discontinuities. For example, the data encoding module 308 may detect the boundaries of one or more road primitives. In another example, the data encoding module may detect a change in the lane configuration such as an initialization, termination, splitting, and/or merging associated with one or more driving lanes.

In some implementations, the data encoding module 308 uses a context encoder. A context encoder may include a hierarchical graph neural network to encode a context of the driving environment. For example, the data encoding module 308 may employ polylines to abstract one or more map elements (e.g., road primitives such as lane markers, cones, traffic signs, etc.) and agent trajectories (e.g., traffic flow data, lane boundaries, etc.). The data encoding module 308 may apply a subgraph network to encode each polyline, which may contain a variable number of vectors. The data encoding module 308 may generate a global graph that models the interactions between polylines. The output of the encoding module 308 may include a global context feature vector for each modulated agent (e.g., detected objects in a driving environment). In some implementations (e.g., when sensory data includes top-down imagery) a convolution neural network may be leveraged as a context encoder. In some implementations, the data encoding module 308 incorporates a machine learning model (e.g., trained and/or implemented as described in connection with FIG. 2).

The output from the data encoding module 308 may be received by target prediction module 310. The target prediction module 310 may determine one or more predicted targets (e.g., target lane destinations). FIG. 4 illustrates an exemplary perceived (e.g., via sensing system 302) driving environment 400 including one or more target destinations 410 that may be located at an intersection of various driving lanes 404 and a perception region 422. In some implementations, driving lanes 404 can be perceived driving lane(s) or driving lanes in a pre-built map (e.g., stored onboard). In some implementations, a predicted target may correspond to each of the one or more driving lanes such that at the intersection of each lane and a boundary of a perception region 422 includes a target destination 410. In some implementations, traffic data can be used to determine one or more lanes associated with a direction of traffic opposite that of a current lane and AV and may filter the target destinations 410 to be limited to lanes perceived as facilitating traffic in a parallel direction to a current lane of the AV. The target prediction module 310 may determine a potential future target destination for one or more of the driving lanes via a set of N discrete, quantized locations (e.g., as described in more detail below in connection with FIG. 4). In some implementations, a distribution over candidate targets can be modeled using a discrete-continuous factorization. For example, a cost function and/or distance function may be used to determine a relationship between a current location (e.g., a current lane) of an AV and the one or more candidate target locations. The target prediction module 310 may employ cost function optimization methodology such as employing, for example, a mean square error, a mean absolute error, Huber loss function, and/or Log-cosh loss function.

In some implementations, target prediction module 310 performs a sampling of candidate targets (e.g., potential future lane destinations). The target prediction module 310 may perform the sampling based on observed road primitives (e.g., observed lane markers) and a state graph of the road associated with a driving environment. In some implementations, the target prediction module 310 may perform interval sampling (e.g., sampling at fixed intervals of distances or angles) without prior knowledge (e.g., map data) of the driving environment.

In some implementations, the target prediction module 310 incorporates a machine learning model (e.g., trained and/or implemented using aspects of FIG. 2). The target prediction module can employ one or more trainable functions implemented using a classifier algorithm. For example, the target prediction module may include a multi-layer perceptron (MLP) using the candidate target coordinates $(x_k, y_k)$ and feature vector (e.g., output from data encoding module 308) as input and determining the one or more candidate target locations as output.

In some implementations, as described below in connection with FIG. 4, sample points (e.g., target destinations 410) may be associated with lane centerlines from a map (e.g., a high definition (HD) map). In some implementations, target prediction module 310 may identify one or more objects (e.g., vehicles associated with a traffic flow), where target prediction module 310 may associate each of the identified objects as being disposed in one or more identified lanes.

In some implementations, for each candidate target, target prediction module 310 may produce a location representation of the target. For example, the target prediction module 310 may produce a tuple, $(ID, \Delta x, \Delta y)$, indicating a target location identification (ID) and a reference location depicted by coordinates $(\Delta x, \Delta y)$ within a mapping of one or more driving lanes. In some implementations, the target prediction module may perform an "over-sampling" of a large number of target candidates as input (e.g., N=1000). This may increase coverage of potential future locations of lanes. A sampling set may be filtered using road primitive data, traffic flow data, and/or perceived geometric properties of the one or more driving lanes and filtered to keep a smaller subset of the target candidates (e.g., the top threshold percentage of the target candidates) that meet a threshold condition. For example, as previously described, the target prediction module may determine that one or more target candidates are associated with one or more lanes having traffic flowing in an antiparallel direction to a flow of traffic of the current lane of the AV. The list of target candidates may be further processed by lane estimation module 312.

In some implementations, the set of candidate targets may be scored and/or filtered based on a probability or likelihood that the candidate target is associated with the current position of the AV. For example, target prediction module 310 may include a machine learning model that is trained to output the one or more candidate targets and a level of confidence associated with each candidate target indicating a likelihood (e.g., probability) that the candidate target is associated with a current lane position of the AV.

Lane estimation module 312 may receive a set of N target destinations as an input and estimate one or more candidate driving paths associated with the one or more driving lanes of the driving environment. Lane estimation module 312 estimates a path (e.g., a curve) connecting a query lane (e.g., a current position of the AV within the query lane) and each of the set of N target candidates, where the path indicates one or more lane waypoints (e.g., locations on a path between a current position of the AV and the target destinations). Lane waypoints may indicate an upcoming trajectory or subpath of a candidate driving path associated with a driving lane or a group of driving lanes (e.g., a trajectory of one or more lanes responding to an upcoming lane state changes such as a merge and/or split of one or more driving lanes). In some implementations, the lane waypoint(s) (e.g., portions of one or more candidate driving paths) may be represented as a connected sequence of line segments expressed as a joint object (e.g., a polyline).

In some implementations, the lane estimation module 312 may include a machine learning model that is trained to receive target destinations, positions of an AV, and other input data received and/or processed by data encoding module 308 and generate one or more outputs indicating the one or more candidate driving paths associated with a driving environment. The lane estimation module 312 may output lane estimation data (e.g., lane waypoints, travel paths, lane trajectories, and/or connectable drivable lane proposals, as previously described).

In some implementations, lane estimation module 312 may perform a polynomial fitting (e.g., a constant-curvature extrapolation) to predict lane waypoints. For example, one or more lanes may be partially detected by sensing system 110 (e.g., part of a lane may be occluded from a view of a camera). Lane estimation module 312 may generate updated lane mapping data that connects segments of perceived lane waypoints together. In some implementations, the lane estimation module 312 may perform a distancing algorithm (e.g., cosine distance, Hausdorff distance, Euclidean distance, etc.) with a selection algorithm (e.g., greedy algorithm, local search algorithm) to determine associations between unconnected segment of lane waypoints.

In some implementations, lane estimation module 312 may generate a polyline indicating the one or more lane waypoints (e.g., using Dubins path logic, Clothoid logic, Spiro logic, etc.). For example, lane estimation module 312 may perform a cubic-curvature regression using a model equation such as:

$$\text{Curvature}=a+b*\text{arc}_{length}+c*(\text{arc}_{length})^2+d*(\text{arc}_{length})^3,$$

where a, b, c, d are empirical parameters. Regression algorithms (e.g., based on a machine learning model) may be leveraged to determine parameters a, b, c, d directly using the current location and the target destination as input. Curvature is a degree to which a path deviates from a driving plane (e.g., how much turn or rotation a vehicle would undergo when following a segment of a candidate driving path). For example, one or more portions or sub-paths of a candidate driving path may be determined and in some cases used to optimize (e.g., identify a path with the least curvature) a parameter associated with the curvature.

The lane metric module 314 may receive lane estimation data (e.g., from lane estimation module 312) and determine a metric (e.g., a score) for one or more of the candidate driving paths. The metric may be associated with an evaluation of each of the candidate driving paths based on geometric properties of the respective path (e.g., favoring paths with smaller curvature) and relation to identified objects (e.g., favoring paths that do not intersect or maintain a predetermined minimum distance from cones, barriers, road signs, temporary lane markers, etc.). In some implementations, the lane metric module 314 includes a machine learning model that receives lane estimation data as input and generates one or more outputs indicating one or more metrics (e.g., scores) of the one or more candidate driving paths. The machine learning model may also generate one or more outputs that include a level of confidence associated with the one or more candidate driving paths. In some implementations, the machine learning model may act as a data filter. For example, N candidate driving paths that have N highest levels of confidence may be identified as adequately representing the one or more driving lanes of the driving environment. In another example, all candidate driving paths having a level of confidence above a particular (e.g., predefined) threshold may be identified as adequately representing driving lane data.

In some implementations, the lane metric module 314 incorporates a machine learning model (e.g., a multi-layer perceptron (MLP) model). For example, a model (e.g., an entropy model, a distancing algorithm, etc.) may be used to score all the lane waypoints. Training of the machine learning model may include a comparison (e.g., a cross entropy analysis) between predicted scores and ground truth scores (e.g., actual locations and lane waypoints of the driving environment such as performed by a human-operated vehicle).

In some implementations, lane metric module 314 rejects one or more candidate driving paths as having a low score and/or being a substantial duplicate of another candidate driving path. In some implementations, the lane metric module 314 includes a candidate driving path selection algorithm to filter near-duplicate lane waypoints. The selection algorithm includes sorting the candidate driving path according to their associated scores in descending order, and then selecting the candidate driving path (e.g., using a greedy algorithm) with the highest score. Processing logic proceeds to the next candidate driving path. The next candidate driving path is compared to previous selected candidate driving paths and a determination is made that the current candidate driving path is distant enough from all the previously selected waypoints. Responsive to processing logic determining the current candidate driving path is distant enough from a prior selected waypoint, the current candidate driving path is selected, otherwise the candidate driving path is excluded. For example, as shown in FIG. 6, one or more candidate driving paths are rejected and one candidate driving path 614 is selected.

In some implementations, processing logic may validate a target driving path (e.g., a selected candidate driving path) by performing a distance comparison analysis between the target driving path and one or more measured ground truth measurement (e.g., physically measured lane trajectories). For example, processing logic may determine whether the target driving path has a Chamfer distance less than a threshold distance with a ground truth lane path. In some implementations, processing logic may validate a target driving path by predicting a level of confidence associated with the target driving path and determining that the level of confidence meets a threshold condition.

As shown in FIG. 3A, lane metric module 314 outputs lane estimation data 316 to the lane tracking module 318. The lane estimation data 316 indicates one or more candidate driving paths associated with one or more driving lanes of a driving environment. The lane tracking module 318 receives the lane estimation data (e.g., through lane query module 304) and may update a mapping of driving lanes to the driving environment and provide updated data to the data encoding module 308 for further processing using updated lane mapping data. In some implementations, the lane tracking module includes aspects and features of the lane tracking module 318 of FIG. 3B.

In some implementations, the lane estimation and tracking system 300 carries out processing functions through data encoding module 308, target prediction module 310, lane estimation module 312, lane metric module 314, lane query module 304, and back to data encoding module 308 repeatedly for a given driving environment. For example, if an AV is driving at an above-threshold speed, the processing lane estimation and tracking system predicts changes to perceived lanes (e.g., based on changes of lanes states and indicated by road primitives) and updates the lane mapping data (e.g., to include the lane state changes such as a lane closure, a lane shift, a lane split, etc.) to make AV navigational decisions associated with upcoming lane state detections. In another example, if an AV is stationary or driving at a below threshold speed the lane estimation and tracking system may perform the above described processing logic to re-estimate and validate previously determined lane states and upcoming navigational decisions.

In some implementations, as discussed previously, one or more of data encoding module 308, target prediction module 310, lane estimation module 312, lane metric module 314 may incorporate the use of one or more machine learning models. Various machine learning inputs and outputs are described in association with each of these machine learning models. Particular numbers and arrangements of machine learning models are described in various implementations below. However, it should be understood that the number and type of machine learning models that are used and the arrangement of such machine learning models can be modified to achieve the same or similar end results. Accordingly, the arrangements of machine learning models that are described and shown are merely exemplary and should not be construed as limiting.

In implementations, one or more machine learning models are trained to perform one or more of the tasks described below. Each task may be performed by a separate machine learning model. Alternatively, a single machine learning model may perform each of the tasks or a subset of the tasks. Additionally, or alternatively, different machine learning models may be trained to perform different combinations of the tasks. In an example, one or a few machine learning models may be trained, where the trained ML model is a single shared neural network that has multiple shared layers and multiple higher level distinct output layers, where each of the output layers outputs a different prediction, classification, identification, etc. The tasks that the one or more trained machine learning models may be trained to perform are as follows:

a. Data encoding—Sensor data (e.g., radar, lidar, camera images, etc.), road primitive measurements (e.g., outputs from road primitive module 214) such as map annotations in the form of splines (e.g., lanes), closed shapes (e.g., regions of intersections) and points (e.g., traffic lights) indicative of a state of a driving environment may be received. Data encoder generates encoded data associated with combination, correlations, and/or artificial parameters. Data encoder can dimensionally reduce the sensor data into groups or features. For example, the data encoder may generate scene encoded data (e.g., feature vectors) that identify one or more road primitives, lane states, and/or traffic flow parameters.

b. Target predictor—Receive scene data (e.g., scene encoded feature vectors) indicating a state of a driving environment and output one or more targets (e.g., target destinations 410 of FIG. 4). The target may include a location associated with an intersection of a perceived lane and a perception region. The target prediction module 310 may determine a potential future target for one or more of the driving lanes via a set of N discrete, quantized location. (See FIG. 4.)

c. Candidate driving path predictor—Receive sets of predicted targets and estimated lane candidate driving paths. Candidate driving path may include predictions of upcoming lane trajectories. Perform one or more of curve generation procedures to determine a connected sequence of line segments (e.g., polylines) associated with the candidate driving path. (See FIG. 5.)

d. Driving path selector—Process sets of candidate driving path to assign metric values (e.g., scores) to each of the candidate driving path. Filter and/or sort the candidate driving paths based on the associated metric values. (e.g., candidate driving paths 614 of FIG. 6) For example, reject candidate driving paths with scores below a threshold value and candidate driving paths that are substantially duplicative to another candidate driving path. (See FIG. 6.)

One type of machine learning model that may be used to perform some or all of the above tasks is an artificial neural network, such as a deep neural network or a graph neural network (GNN). Artificial neural networks generally include a feature representation component with a classifier or regression layers that map features to a desired output space. A convolutional neural network (CNN), for example, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g. classification outputs). Deep learning is a class of machine learning algorithms that use a cascade of multiple layers of nonlinear processing units for feature extraction and transformation. Each successive layer uses the output from the previous layer as input. Deep neural networks may learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation. In a driving path selector, for example, the raw input (e.g., first set of layers) may be sensor data associated with a state of a driving environment; a second set of layers may compose encoded feature data associated with one or more mapped driving lane data or detected objects disposed within the driving environment (e.g., road primitive such as cones, signs, lane markers, etc.); a third set of layers may include identifying target candidate locations (e.g., target destinations 410 of FIG. 4) associated with the mapped driving lanes. Notably, a deep learning process can learn which features to optimally place in which level on its own. The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs may be that of the network and may be the number of hidden layers plus one. For recurrent neural networks, in which a signal may propagate through a layer more than once, the CAP depth is potentially unlimited.

In one implementation, one or more machine learning models is a recurrent neural network (RNN). An RNN is a type of neural network that includes a memory to enable the neural network to capture temporal dependencies. An RNN is able to learn input-output mappings that depend on both a current input and past inputs. The RNN will address past and future scene encoded data and make predictions based on this continuous metrology information (e.g., inferring lane continuity absent the presence of a measured road primitive). RNNs may be trained using a training dataset to generate a fixed number of outputs (e.g., to estimate candidate driving paths and/or predict future lane states). One type of RNN that may be used is a long short-term memory (LSTM) neural network.

Training of a neural network may be achieved in a supervised learning manner, which involves feeding a training dataset consisting of labeled inputs through the network, observing its outputs, defining an error (by measuring the difference between the outputs and the label values), and using techniques such as deep gradient descent and back-propagation to tune the weights of the network across all its layers and nodes such that the error is minimized. In many applications, repeating this process across the many labeled inputs in the training dataset yields a network that can produce correct output when presented with inputs that are different from the ones present in the training dataset.

For the model training of the one or more machine learning model, a training dataset containing hundreds, thousands, millions, tens of millions or more of sensor measurements (e.g., received from sensing system 110), data indicating a state of a driving environment (e.g., received from environment 306, and/or lane mapping data (e.g., received from lane query module 304) should be used to form one or more training datasets. In implementations, the training dataset may also include associated scene encoded data (e.g., feature vectors) for forming a training dataset, where each input data point is associated with encoded scene data (e.g., a feature vector) or classifications of one or more types of useful information. The machine learning models (e.g., associated with data encoding module 308) may be trained, for example, to generate outputs indicating scene encoded data (e.g., feature vectors) associated with sensor data, lane mapping data, and/or environment data corresponding to a state of a driving environment.

In some implementations, a training dataset containing hundreds, thousands, millions, tens of millions or more scene encoded data (e.g., feature vectors) is used to form a training dataset. The training data set may also include an associated set of candidate target locations forming a training dataset. The machine learning models (e.g., associated with target prediction module 310) may be trained, for example, to generate outputs indicating one or more target candidate locations associated with the encoded scene data.

In some implementations, a training dataset containing hundreds, thousands, millions, tens of millions or more sets of target candidate locations is used to form a training dataset. The training data set may also include an associated set of estimated candidate driving paths forming a training dataset. The machine learning models (e.g., associated with lane estimation module 312) may be trained, for example, to generate outputs indicating one or more estimated candidate driving paths associated with the set of candidate target locations.

In some implementations, a training dataset containing hundreds, thousands, tens of thousands, hundreds of thousands or more candidate driving paths is used to form a training dataset. The training data set may also include lane waypoint metrics (e.g., scores). The machine learning models (e.g., target prediction module 310) may be trained, for example, to generate outputs indicating one or more candidate driving path metrics (e.g., scores) associated with the candidate driving path.

To effectuate training, processing logic inputs the above described training dataset(s) into one or more untrained machine learning models. Prior to inputting a first input into a machine learning model, the machine learning model may be initialized. Processing logic trains the untrained machine learning model(s) based on the training dataset(s) to generate one or more trained machine learning models that perform various operations as set forth above.

Training may be performed by inputting one or more of the training datasets into the machine learning model one at a time. The machine learning model processes the input to generate an output. An artificial neural network includes a first set of layers that consists of values in a data point. The next set of layers is called a set of hidden layers, and nodes within the hidden layers each receive one or more of the input values. Each node contains parameters (e.g., weights) to apply to the input values. Each node therefore essentially inputs the input values into a multivariate function (e.g., a non-linear mathematical transformation) to produce an output value. A next set of layers may be another set of hidden layers or a set of output layers. In either case, the nodes at the next set of layers receive the output values from the nodes at the previous layer, and each node applies weights to those values and then generates its own output value. This may be performed at each layer. A final set of layers is the output set of layers, where there is one node for each class, prediction and/or output that the machine learning model can produce.

Accordingly, the output may include one or more predictions or inferences. For example, an output prediction or inference may include scene encoded data, set of candidate target locations, candidate driving paths, and/or candidate driving path metrics. Processing logic may then compare the predicted or inferred output to one or more ground truth measurements (e.g., measured lane dimensions and trajectories) that may be included in the training data item. Processing logic determines an error (i.e., a classification error) based on the differences between the output of the machine learning model and the known classification (e.g., a target driving path compared to ground truth measurements). Processing logic adjusts weights of one or more nodes in the machine learning model based on the error. An error term or delta may be determined for each node in the artificial neural network. Based on this error, the artificial neural network adjusts one or more of its parameters for one or more of its nodes (the weights for one or more inputs of a node). Parameters may be updated in a back propagation manner, such that nodes at a highest layer are updated first, followed by nodes at a next layer, and so on. An artificial neural network contains multiple layers of "neurons", where each layer receives, as input, values from neurons at a previous layer. The parameters for each neuron include weights associated with the values that are received from each of the neurons at a previous layer. Accordingly, adjusting the parameters may include adjusting the weights assigned to each of the inputs for one or more neurons at one or more layers in the artificial neural network.

Once the model parameters have been optimized, model validation may be performed to determine whether the model has improved and to determine the current accuracy of the deep learning model. After one or more rounds of training, processing logic may determine whether a stopping criterion has been met. A stopping criterion may be a target level of accuracy, a target number of processed images from the training dataset, a target amount of change to parameters over one or more previous data points, a combination thereof and/or other criteria. In one implementation, the stopping criteria is met when at least a minimum number of data points have been processed and at least a threshold accuracy is achieved. The threshold accuracy may be, for example, 70%, 80% or 90% accuracy. In one implementation, the stopping criteria is met if accuracy of the machine learning model has stopped improving. If the stopping criterion has not been met, further training is performed. If the stopping criterion has been met, training may be complete. Once the machine learning model is trained, a reserved portion of the training dataset may be used to test the model.

As an example, in one implementation, a machine learning model (e.g., driving path selector) is trained to determine candidate driving paths and/or candidate driving path metrics. A similar process may be performed to train machine learning models to perform other tasks such as those set forth above. A set of many (e.g., thousands to millions) target candidate locations data points may be collected and candidate driving paths and/or candidate driving path metrics associated with the target candidate locations may be determined.

Once one or more trained machine learning models are generated, the models be stored in model storage (e.g., data repository 250 of FIG. 2), Processing logic associated with an AV may then use the one or more trained ML models as well as additional processing logic to implement an automatic mode, in which user manual input of information is minimized or even eliminated in some instances. For example, processing logic associated with an AV may initiate use of the one or more ML models and make AV navigation decisions based on the one or more outputs of the ML models.

Figure 3B:
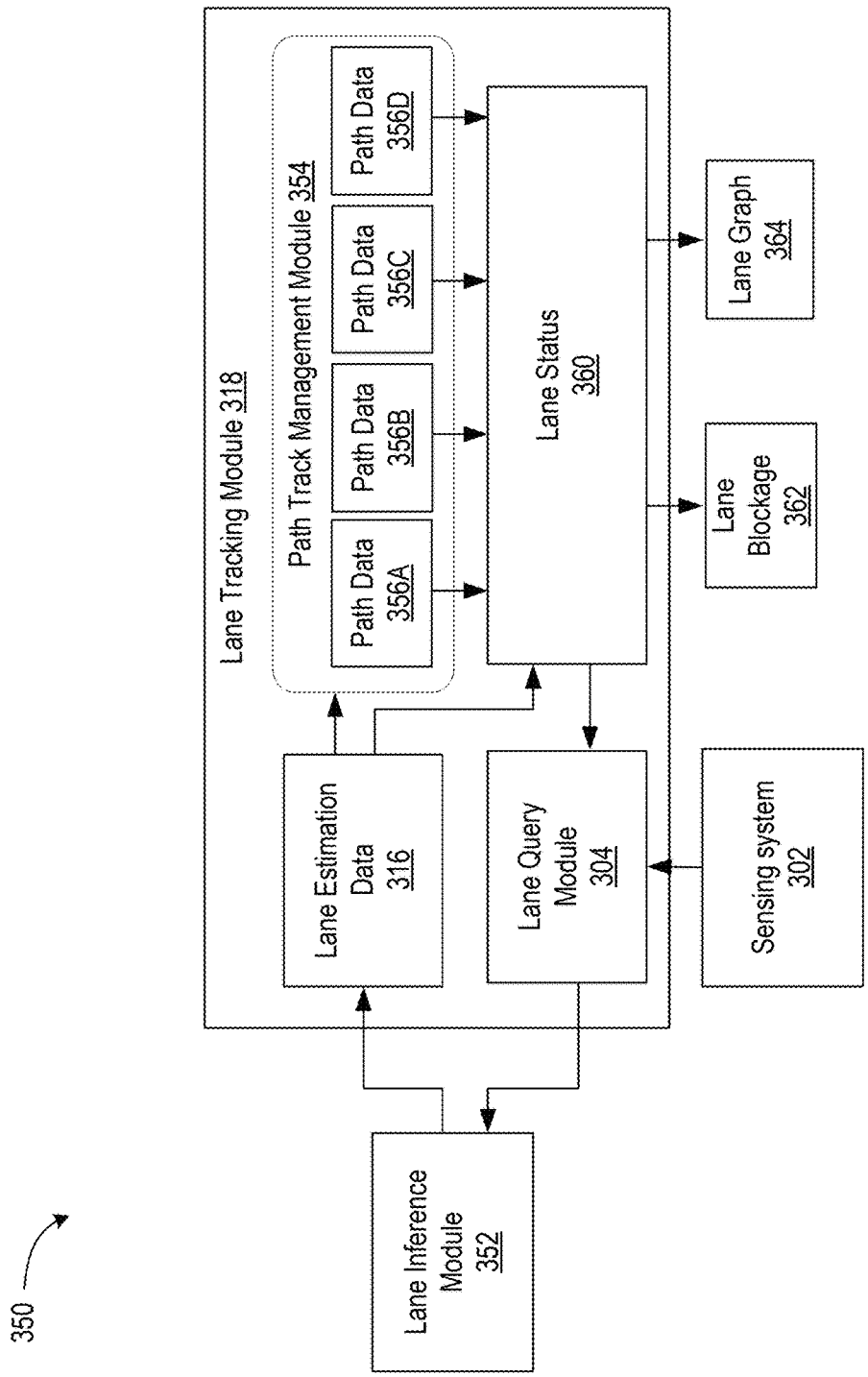
FIG. 3B is a block diagram that illustrates a lane estimation and tracking system in which implementations of the disclosure may operate.

FIG. 3B is a block diagram that illustrates a lane estimation and tracking system 350 in which implementations of the disclosure may operate. As discussed above in association with FIG. 3A, the lane query module 304 may receive location data and/or map data associated with a driving environment from sensing system 302. The lane query module 304 may determine a current mapping of driving lanes to a current driving environment based on the received input data. For example, as will be discussed further in connection with FIG. 4, a current mapping of perception region 422 may include one or more driving lanes 404. The lane query module 304 may obtain the current mapping of driving lanes from mapping data (e.g., stored onboard the AV). The current mapping of driving lanes may include identification data (e.g., labeling of the lanes, ID of the lanes, etc.) and/or a state of each lane. The state of each lane may include one or more of geometric, semantic, and/or topological data associated with each lane. For example, geometric data may include parts of a sequence of lane center waypoint coordinates, center-to-boundary widths, headings, curvatures, and the like. Semantic data may include information like speed limit, associated traffic controls, and the like. Topological data may include potential lane merge/split points and associated likelihood (e.g., identifying features such objects (e.g., road primitives), traffic flows (e.g., orientation of one or vehicles) that may indicate an upcoming merge and/or a split of an associated lane). In some implementations, lane query module 304 may receive sensing data (e.g., from sensing system 110) that indicates relocation of an AV to a new environment. For example, the lane query module 304 may retrieve mapping data (e.g. map info 124) associated with the new environment and update current mapping of driving lanes to be based on the retrieved mapping data. In some implementations, the lane query module 304 may receive location data (e.g., from GPS 122) and update the current mapping of driving lanes in association with the received location data. For example, lane query module 304 may retrieve updated mapping data (e.g., map info 124) based on the location data (e.g., indicating relocation of the AV to a new environment). In some implementations, the lane query module 304 may include data of a current position of an AV within the mapping of the driving lanes.

As discussed in association with FIG. 3A, data from the lane query module 304 may be processed by a lane inference module 352. The lane inference module 352 may include one or more aspects and/or features of the data encoding module 308, the target prediction module 310, the lane estimation module 312, and/or the lane metric module 314 of FIG. 3A. The data processing module may output lane estimation data 316 to the lane tracking module 318.

The lane estimation data 316 may be received and processed by a path track management module 354. The path track management module 354 may include a current perception of multiple paths (e.g., represented by path data 356A-D). The perception of multiple paths may include upcoming data such as associations between road primitive and upcoming lane changes of one or more lanes proximate an AV (e.g., within a driving environment of an AV). Each lane may be represented by individual path data 356A-D. The lane tracking module may synthesize the path data 356A-D to determine overall lane status 360 of the driving environment proximate the AV. For example, the lane status 360 may determine the predicted trajectory of one or more lanes of a driving environment of the AV.

In some implementations, the lane tracking module 318 may determine the status 360 of lane (e.g., temporary lane closure) based on updates to the path data 356A-D based on the lane estimation data 316. Using the determination made by the lane tracking module 318 of the lane status, the lane tracking module 318 may output actionable data to the AV (e.g., to the AVCS 140). For example, the actionable data may include lane blockage data 362 and/or lane graph data 364). The lane blockage data 362 may include areas in the neighboring geography that are inaccessible or are determined to be non-drivable (e.g., construction zones, non-driving environment, etc.). The lane graph 364 can include one or more driving paths of the AV and/or driving paths associated with other objects in the driving environment (e.g., vehicles, pedestrians, etc.). The AVCS 140 can output instructions to powertrain, brakes and steering 150 to route the AV through a temporary travel path (e.g., a detour) and return the AV to an original driving path after determining the status of the associated lane has returned to a previous state (e.g., a normal or active lane state). Additionally, or alternatively, in the same example, the lane tracking module 318 can determine that a candidate object (e.g., road primitive) in disposed in a drivable lane associated with a current location of the AV. Based on this determination, the AVCS 140 can output instructions to the powertrain, brakes, and steering 150 to drive around the candidate object. The lane tracking module 318 may provide data used to predict the behavior of objects (e.g., vehicles, pedestrians, etc.) in the driving environment of the AV. The AVCS 140 may alter driving behavior of the AV responsive to data indicating future states of objects within the driving environments. For example, the lane tracking module 318, through updates to the path data 356A-D of the path track management module 354, may detect a construction zone and detect that an oncoming lane shifts or merges into the current lane of the AV. The lane tracking module 318 may communicate to the AV to choose to yield or nudge accordingly based on the object detection (e.g., oncoming vehicles).

FIG. 4 is a schematic illustration of a perceived driving environment 400 processed using a target prediction module, in accordance with some implementations of the present disclosure. As shown in FIG. 4, the perceived driving environment 400 may include a current location 402 of an AV, one or more driving lanes 404, one or more perceived vehicles 406, detected road primitives (e.g., cones 408), one or more identified target destinations 410, and a query lane 412 associated with the AV within a perception region 422. As described in previous implementations, perception data (e.g., scene encoded feature vectors) may be received by a target prediction module 310 and processed to determine one or more target destinations 410. As shown in FIG. 4, processing logic may perform a query searching for one or more driving lanes 404. The query lane 412 may determine one or more trajectories of lanes within a proximity of an AV. The query lane 412 may include an immediate trajectory of other neighboring lanes proximate a current lane of the AV. Processing logic may determine one or more target destinations 410 corresponding to the one or more perceived driving lines 404. A target r may include a location (x,y) associated with a candidate driving path (e.g., a trajectory that a driving lane 404 is likely to be at a fixed time and/or distance interval).

In some implementations, a set of target destinations 410 may include a target destination for every driving lane 404 of a driving environment 400. The set may further be refined (e.g., filtered) based on relationships between detected road primitive (e.g., cones 408), traffic flow (e.g., locations of one or more vehicles 406, direction of flow of the one or more vehicles 406), and proximity to a current location 402 of the AV.

In some implementations, as previously described, a target prediction module (e.g., target prediction module 310 of FIG. 3A) may include sampling the one or more driving lanes 404 and determining a first set of target destinations 410. The target prediction module may further process the first set of target destinations 410 using processing logic association with classification and/or regression of the first set of target destinations 410 to generate a subset of the target destinations 410 with an increased likelihood of providing an accurate driving path from the current location 402 to one or more of the target destinations 410 identified within the second set. In some implementations, the target prediction may be made from a current position of the AV, however in other implementations, the target prediction may be made from any perceivable lane by the AV (e.g., such as to determine further states of other objects disposed within the other queried lanes).

Figure 5:
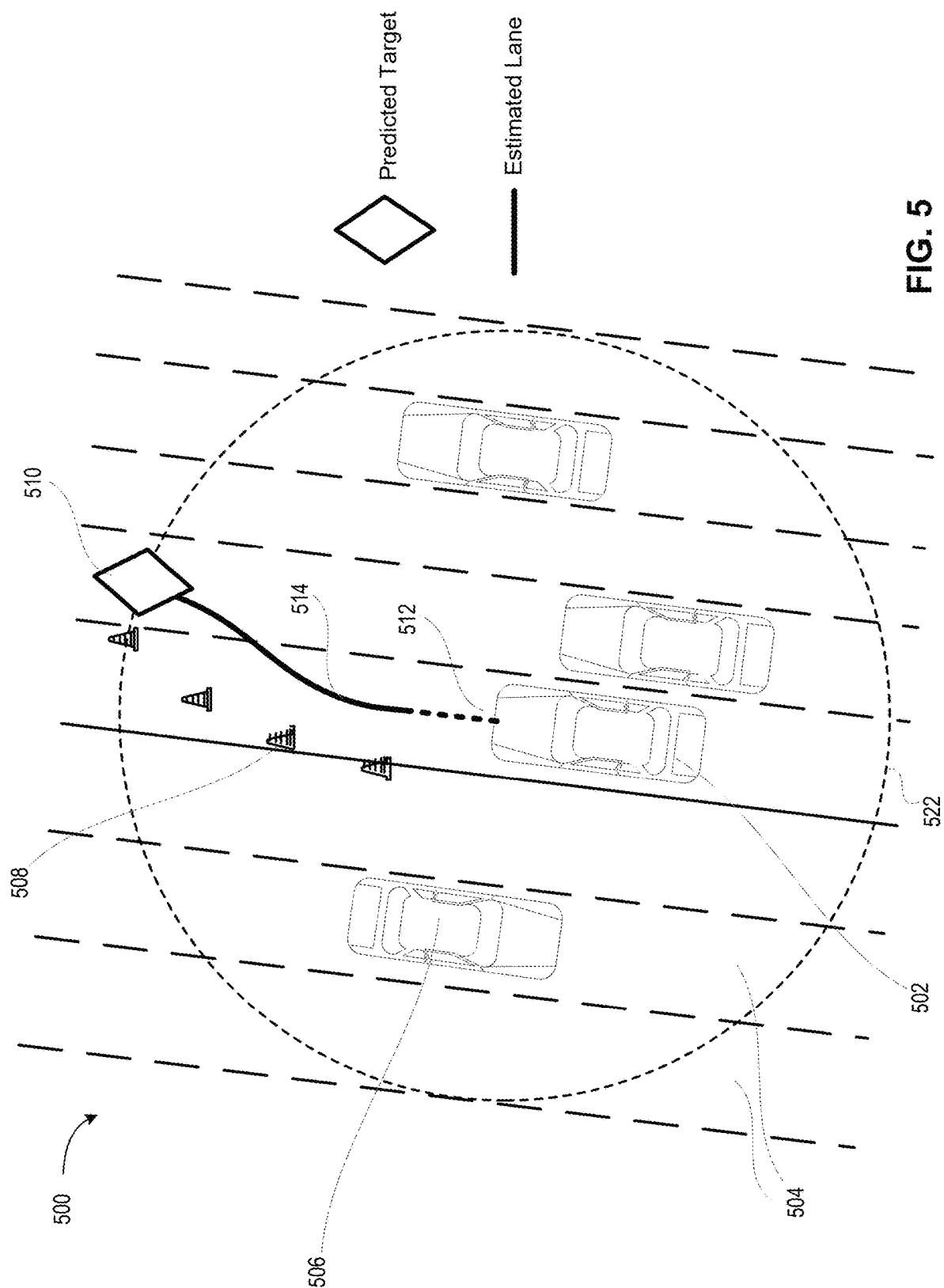
FIG. 5 is a schematic illustration of a perceived driving environment processed using a lane estimation module, in accordance with some implementations of the present disclosure.

FIG. 5 is a schematic illustration of a perceived driving environment 500 processed using a lane estimation module, in accordance with some implementations of the present disclosure. As shown in FIG. 5, the perceived driving environment 500 may include a current location 502 of an AV, one or more perceived lanes 504, one or more perceived vehicles 506, detected road primitives (e.g., cones 508), one or more identified target destinations 510, a determined travel path 512 associated with the AV, and one or more candidate driving paths 514. As described in previous implementations, perception data (e.g., scene encoded feature vectors) may be received by a lane estimation module (e.g., lane estimation module 312) including one or more target destinations 510 and processed to determine one or more candidate driving paths 514 within a perception region 522. As shown in FIG. 5, processing logic may determine a candidate driving path 514 by estimating a curve between a current location 502 of the AV and one of the target destinations 510. FIG. 5 expressly shows one candidate driving path 514 connecting the current location 502 of the AV to one depicted target destination 510, but any number of candidate driving paths may be generated. For example, a candidate driving path may connect the current location 502 of the AV to each target destination illustrated in FIG. 4.

In some implementations, as previously described, candidate driving paths 514 may indicate an upcoming trajectory or travel path of an associated perceived lane 504 lane or associated group of lanes (e.g., a trajectory of one or more lanes responding to an upcoming lane state change such as a merge and/or split of one or more driving lanes). In some implementations, the candidate driving paths 514 may be represented as a connected sequence of line segments expressed as an individual object (e.g., a polyline), as will be discussed further in association with FIG. 7.

FIG. 6 is a schematic illustration of a perceived driving environment 600 processed using a lane metric module, in accordance with some implementations of the present disclosure. As shown in FIG. 6, the perceived driving environment 600 may include a current location 602 of an AV, one or more perceived driving lanes 604, one or more perceived vehicles 606, detected road primitives (e.g., cones 608), one or more identified target destinations 610, a determined travel path 612 associated with the AV, and one or more candidate driving paths 614 within a perception region 622. As described in previous implementations, perception data (e.g., scene encoded feature vectors) may be received by a lane estimation module (e.g., lane metric module 314) including one or more lane waypoints and processed to determine one or more lane waypoint metrics. Lane metric module 314 may process sets of lane waypoints to assign metric values (e.g., scores) to each of the lane waypoints. The processing logic may filter and/or sort candidate driving paths 614 using the received and processed waypoints based on the associated metric values. For example, processing logic may reject candidate driving paths 614 with scores below a threshold value and candidate driving paths 614 that are substantially duplicative to other driving paths. As shown in FIG. 6, some of the candidate driving paths 614 are indicated as rejected (depicted with dashed lines) and one of the lane candidate driving paths 614 is indicated as accepted (depicted with solid lines). In some implementations, locations of identified target destination 610 are further refined. For example, further scene data and data processing from identifying potential travel paths may result in the target destinations 610 to be shifted to fit a higher scoring travel path.

Figure 7:
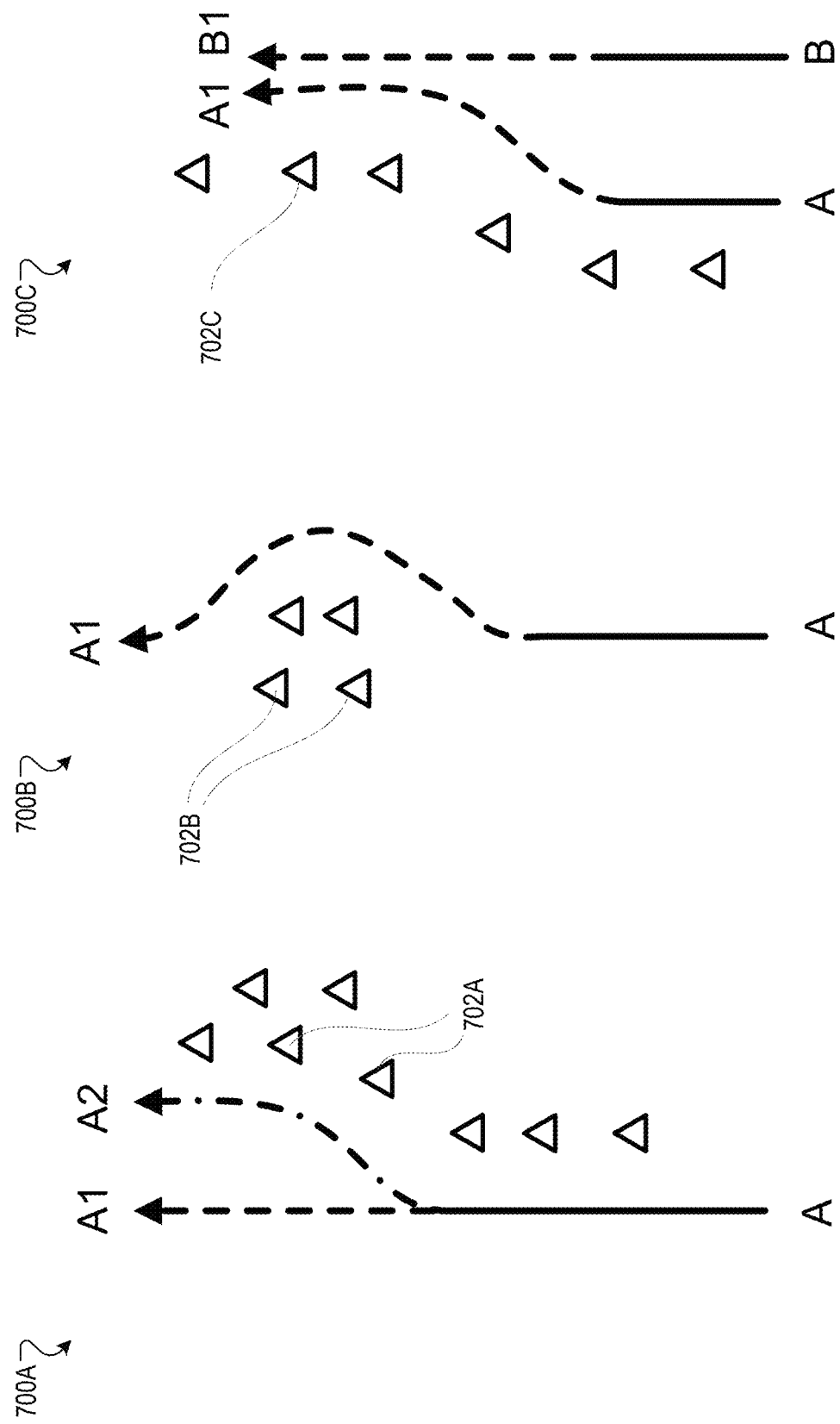
FIG. 7 illustrates lane waypoints of a lane estimation and tracking system, in accordance with some implementations of the present disclosure.

FIG. 7 illustrates lane waypoints 700A-C of a lane estimation and tracking system, in accordance with some implementations of the present disclosure. As described in previous implementations, a lane estimation and tracking system may perform a lane estimation procedure by generating a curve between a first location (e.g., current location of an AV) and a second location (e.g., a target candidate location). In some implementations, the predicted lane waypoints may include one or more connected drivable lane proposals. For example, if a lane is forked into two at some point, the processing logic may output two lane proposals. In another example, if a lane is closed at some point, and/or merging with a neighboring lane, the output may indicate one shifted lane that is gradually overlapping with the neighboring lane.

Three exemplary lane waypoints 700A-C are shown along with one or more road primitives 702A-C (e.g., cones) that provide context to the lane waypoints 700A-C. For example, lane waypoints 700A are associated with a lane splitting into two lanes. In another example, lane waypoint 700B is associated with a lane shifting in a first direction and shifting back in a second direction. In another example, lane waypoints 700C are associated with a first lane shifting in close proximity to a second lane.

Figure 8:
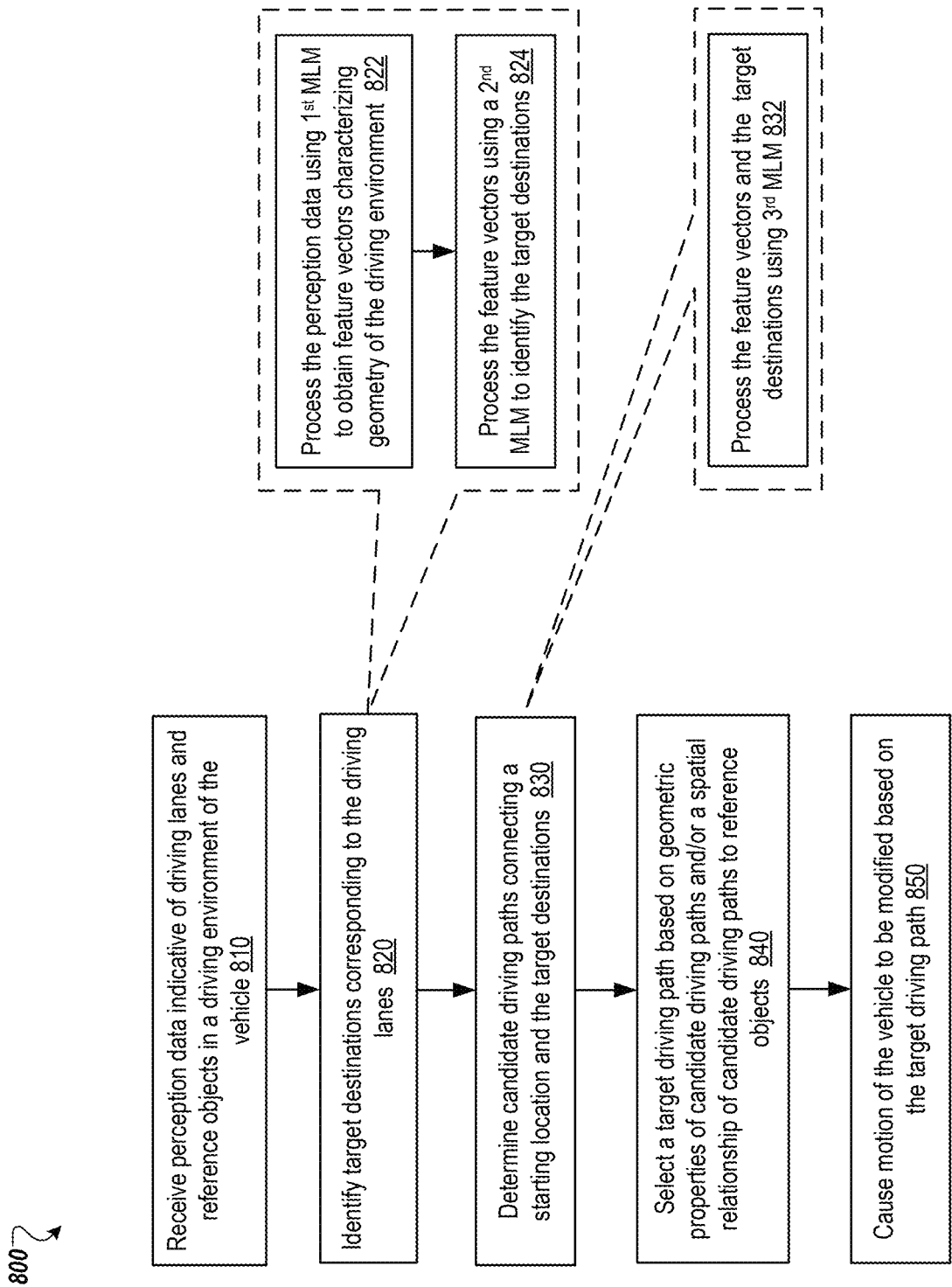
FIG. 8 illustrates an example method of lane estimating and tracking, in accordance with some implementations of the present disclosure.

FIG. 8 illustrates an example method 800 of lane estimating and tracking, in accordance with some implementations of the present disclosure. A processing device, having one or more processing units (CPUs), and or graphics processing units (GPU), telematics control units (TCUs), and memory devices communicatively coupled to the CPU(s) and/or GPUs, can perform method 800 and/or each of its individual functions, routines, subroutines, or operations. The processing device executing method 800 can perform instructions issued by various components of the perception system 130 of FIG. 1, e.g., LETM 132. In some implementations, method 800 may be directed to systems and components of an autonomous driving vehicle, such as the autonomous vehicle 100 of FIG. 1. In some implementations, method 800 may be used to improve performance of the autonomous vehicle data processing system 120 and/or the autonomous vehicle control system 140. In some implementations, method 800 may be used to improve performance of a data processing system of a vehicle equipped with a driver assistance system. In certain implementations, a single processing thread may perform method 800. Alternatively, two or more processing threads may perform method 800, each thread executing one or more individual functions, routines, subroutines, or operations of the methods. In an illustrative example, the processing threads implementing method 800 may be synchronized (e.g., using semaphores, critical sections, and/or other thread synchronization mechanisms). Alternatively, the processing threads implementing method 800 may be executed asynchronously with respect to each other. Various operations of method 800 may be performed in a different order compared with the order shown in FIG. 8. Some operations of method 800 may be performed concurrently with other operations. Some operations may be optional.

At block 810, method 800 may include receiving, e.g., by a processing device (logic) of the data processing system of a vehicle, a perception data indicative of one or more driving lanes and one or more reference objects in a driving environment of the vehicle (e.g., driving environment 101 of FIG. 1) The perception data may be received from a sensing system of the vehicle (e.g., sensing system 110). At least some of the one or more reference objects may be or include any suitable lane positioning marker, e.g., a pavement marking, a cone or a plastic/concrete block indicating a temporary or permanent lane boundary, a sign indicating a lane shift, a lane closure, lane merge, etc. At least some of the one or more reference objects may be or include a vehicle. In some implementations, processing logic may receive the perception data and generate synthetic data associated with various combinations, correlation, and/or artificial parameters. Processing logic may dimensionality reduce the received input data into groups or features. For example, processing logic may generate features that include one or more road primitive measurement and/or lane states. In some implementations, processing logic performs any of partial least squares analysis, principal component analysis, multifactor dimensionality reduction, nonlinear dimensionality reduction, and/or any combination thereof. In some implementations, processing logic is designed for edge detection of the received input data. For example, processing logic includes methodology that aims at identifying perception data that changes sharply and/or that include discontinuities. For example, the processing logic may detect the boundaries of one or more road primitives.

At block 820, method 800 may continue with the processing logic identifying one or more target destinations. Each of the one or more target destinations may correspond to one of the one or more driving lanes. A target i may include a location (x,y) associated with a lane waypoint (e.g., a trajectory that a lane is likely to be at a fixed time and/or distance interval). Processing logic may determine a potential future target destination for one or more of the driving lanes via a set of N discrete, quantized locations. In some implementations, a distribution over candidate targets may be modeled using a discrete-continuous factorization. For example, a cost function and/or distance function may be used to determine a relationship between a current location of an AV and the one or more candidate target locations. Processing logic may employ cost function optimization methodology such as employing, for example, a mean square error, a mean absolute error, Huber loss function, and/or Log-Cosh loss function.

The top callout portion of FIG. 8 illustrates operations that can be performed as part of block 820. More specifically, at block 822, method 800 may include processing the perception data using a first MLM to obtain one or more feature vectors characterizing geometry of the driving environment of the vehicle. The first MLM may be any one or more MLMs identified herein, e.g., MLMs used in association with data encoding module 308 of FIG. 3A.

At block 824, method 800 may include processing the one or more feature vectors using a second MLM to identify the one or more target destinations. The second MLM may be any one or more MLMs identified herein, e.g., MLMs used in association with target prediction module 310 of FIG. 3A).

At block 830, method 800 includes determining a plurality of candidate driving paths. Each candidate driving path of the plurality of candidate driving paths may connect a starting location in a starting driving lane of the one or more driving lanes to one of the one or more target destinations. For example, the processing logic may receive a set of N target candidates as input and estimate one or more lane waypoints associated with the one or more driving lanes of the driving environment. Lane estimation module estimates a path (e.g., a curve) connecting a current position of an AV within a lane and each of the set of N target candidates, where the path indicates the lane waypoint. Lane waypoints may indicate an upcoming trajectory or travel path of an associated lane or associated group of lanes (e.g., a trajectory of one or more lanes responding to an upcoming lane state change such as a merge and/or split of one or more driving lanes). In some implementations, at least one candidate driving path of the plurality of candidate driving paths may be represented using a polyline representation or a polynomial curve. For example, the lane waypoint(s) may be represented as a connected sequence of line segments expressed as an individual object (e.g., a polyline).

The bottom callout portion of FIG. 8 illustrates operations that can be performed as part of block 830. More specifically, at block 832, method 800 may include processing the feature vectors and the one or more target destinations using a third MLM. The third MLM may be any one or more MLMs identified herein, e.g., MLMs used in association with lane estimation module 312 of FIG. 3A.

At block 840, method 800 may continue with the processing selecting a target driving path from the plurality of candidate driving paths based on geometric properties of each candidate driving path of the plurality of candidate driving paths and a spatial relationship of a respective candidate driving path to the one or more reference objects.

In some implementations, the geometric properties may include a plurality of curvature values characterizing curvature of the respective candidate driving path at a plurality of locations along the respective candidate driving path. In some implementations, selecting the target driving path may include computing an evaluation metric using the plurality of curvature values. In some implementations the evaluation metric may be selected to favor lower curvature values over higher curvature values. In some implementations, the evaluation metric (score) may further favor driving paths that maintain a predetermined distance from each of the one or more reference objects, e.g., a cone or a plastic block indicating a temporary lane boundary, a sign indicating a lane shift, a lane closure, lane merge, and the like. The evaluation metric (score) may be used for selecting the target driving path.

In some implementations, processing logic rejects one or more candidate driving paths as having a low score (evaluation metric) and/or being a substantial duplicate of another driving path. In some implementations, processing logic includes a driving path selection algorithm to filter near-duplicate lane waypoints. The selection algorithm includes sorting the driving paths according to their associated scores in descending order, and then selecting the driving paths (e.g., using a greedy algorithm) with the highest score. Processing logic proceeds to the next driving path. The next driving path is compared to previous selected driving paths and a determination is made that the current driving path is distant enough from all the previously selected waypoints. Responsive to processing logic determining the current driving path is distant enough from a prior selected driving path, the current driving path is selected, otherwise the driving path is excluded.

In some implementations, operations of block 840 may be performed using a fourth MLM that processes candidate driving paths to select the target driving path (the fourth MLM may be trained to assign a score for each candidate path and select the target driving path based on the scores, e.g., by selecting the candidate path with the highest score). The fourth MLM model may be any one or more MLMs identified herein, e.g., MLMs used in association with lane metric module 314 of FIG. 3A. In some implementations, one or more of the first MLM, the second MLM, the third MLM, and/or the fourth MLM may be combined and trained together. In some implementations, one or more of the first MLM, the second MLM, the third MLM, and/or the fourth MLM may be trained separately. In some implementations, any one of the first MLM, the second MLM, the third MLM, and/or the fourth MLM may be divided into additional MLMs.

At block 850, method 800 includes causing a motion of the vehicle to be modified based on the target driving path. For example, the selected target driving path may be provided to AVCS 140 and AVCS 140 may direct the vehicle (e.g., an autonomous vehicle) along the target path. In particular, if a tracked connected drivable lane proposal indicates a merging of a current lane to a neighboring lane based on road primitive data, processing logic can cause slowing of the autonomous vehicle to a speed that ensures that the vehicle can safely merge into the neighboring lane, direct the vehicle to change lanes in anticipation of the merge if the adjacent lane is free from obstructions, and/or perform some other driving maneuver. In another example, the selected target driving path may be provided (e.g., using any suitable graphics user interface) to a driver of a vehicle equipped with a driver-assistance system, and the driver may direct the vehicle along the target driving path. In some implementations, method 800 may include updating, using the target driving path, a road map information stored on the vehicle or otherwise accessible to the vehicle.

Figure 9:
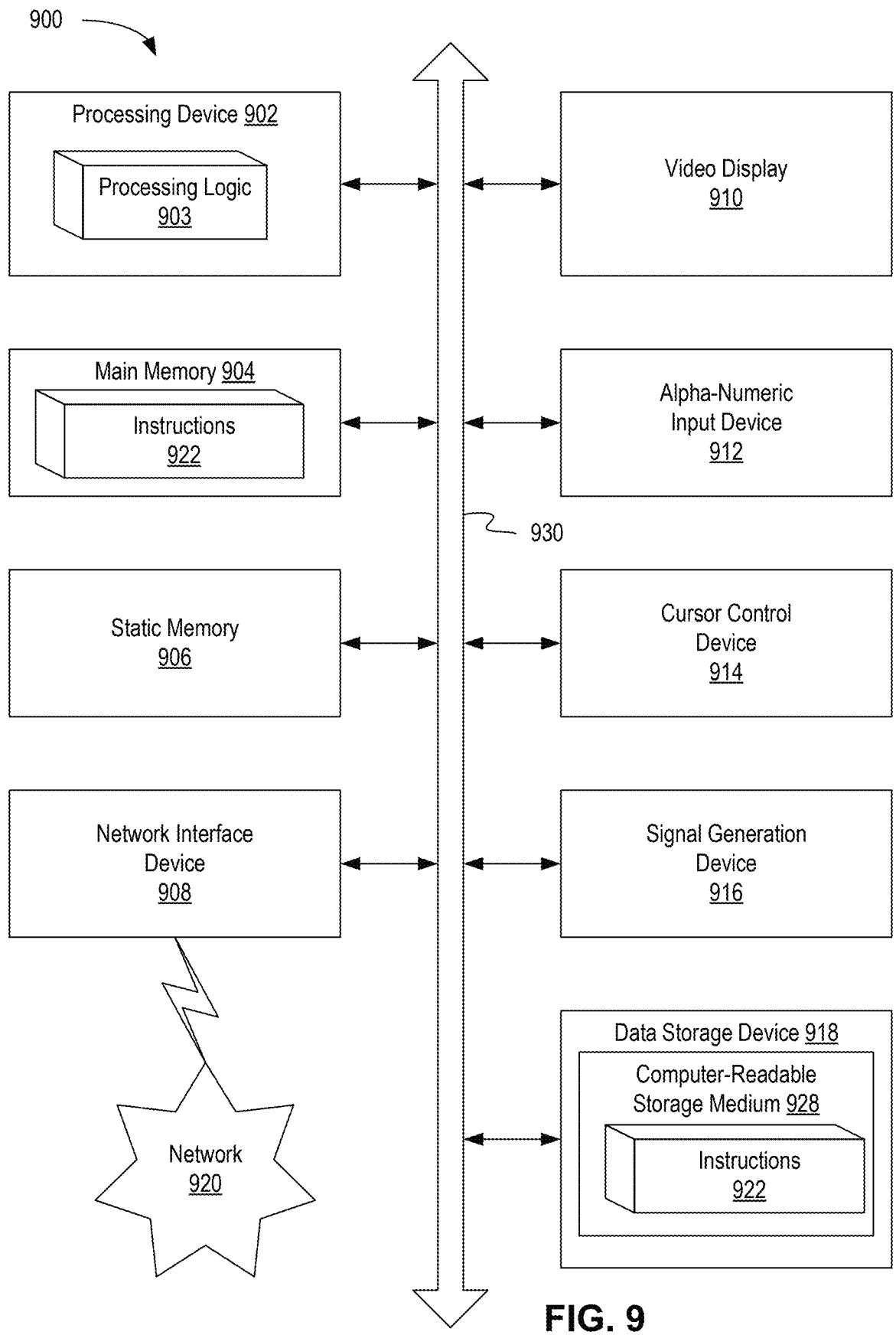
FIG. 9 depicts a block diagram of an example computer device capable of lane estimation and tracking in autonomous driving environments.

FIG. 9 depicts a block diagram of an example computer device 900 capable of lane estimation and tracking in autonomous driving environments, in accordance with some implementations of the present disclosure, in accordance with some implementations of the present disclosure.

Example computer device 900 can be connected to other computer devices in a LAN, an intranet, an extranet, and/or the Internet. Computer device 900 can operate in the capacity of a server in a client-server network environment. Computer device 900 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 900 can include a processing device 902 (also referred to as a processor or CPU), a main memory 904 (e.g., read-only memory (ROM), flash memory, dynamic random access memory (DRAM) such as synchronous DRAM (SDRAM), etc.), a static memory 906 (e.g., flash memory, static random access memory (SRAM), etc.), and a secondary memory (e.g., a data storage device 918), which can communicate with each other via a bus 930.

Processing device 902 (which can include processing logic 903) represents one or more general-purpose processing devices such as a microprocessor, central processing unit, or the like. More particularly, processing device 902 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 902 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 902 can be configured to execute instructions performing method 800 of lane estimating and tracking.

Example computer device 900 can further comprise a network interface device 908, which can be communicatively coupled to a network 920. Example computer device 900 can further comprise a video display 910 (e.g., a liquid crystal display (LCD), a touch screen, or a cathode ray tube (CRT)), an alphanumeric input device 912 (e.g., a keyboard), a cursor control device 914 (e.g., a mouse), and an acoustic signal generation device 916 (e.g., a speaker).

Data storage device 918 can include a computer-readable storage medium (or, more specifically, a non-transitory computer-readable storage medium) 928 on which is stored one or more sets of executable instructions 922. In accordance with one or more aspects of the present disclosure, executable instructions 922 can comprise executable instructions performing method 800 of lane estimating and tracking.

Executable instructions 922 can also reside, completely or at least partially, within main memory 904 and/or within processing device 902 during execution thereof by example computer device 900, main memory 904 and processing device 902 also constituting computer-readable storage media. Executable instructions 922 can further be transmitted or received over a network via network interface device 908.

While the computer-readable storage medium 928 is shown in FIG. 9 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
receiving, by a processing device, perception data from a sensing system of a vehicle, the perception data indicative of (i) one or more road primitives in a driving environment of the vehicle, (ii) a first configuration of a plurality of driving lanes at a first range of distances from the vehicle, and (iii) a second configuration of the plurality of driving lanes at a second range of distances from the vehicle, the second range being longer than the first range;
determining, based on the perception data, a correspondence of the first configuration of the plurality of driving lanes to the second configuration of the plurality of driving lanes, wherein determining the correspondence comprises:
    identifying, by the processing device, a plurality of target destinations, each of the plurality of target destinations identified for a corresponding driving lane of the second configuration of the plurality of driving lanes;
    evaluating, by the processing device, a plurality of candidate driving paths, wherein each candidate driving path of the plurality of candidate driving paths connects a starting location in a starting driving lane of the first configuration of the plurality of driving lanes with a respective target destination, of the plurality of target destinations, identified for a corresponding driving lane of the second configuration of the plurality of driving lanes, and wherein said each candidate driving path is evaluated in view of (i) a curvature of the candidate driving path and (ii) a spatial relationship of the candidate driving path to the one or more road primitives located between the first range of distances and the second range of distances; and
    selecting, by the processing device, and based on the evaluation of the plurality of candidate driving paths, a target driving path from the plurality of candidate driving paths; and causing, by the processing device, a motion of the vehicle to be modified based on the determined correspondence.

2. The method of claim 1, wherein the curvature of said each candidate driving path is represented with a plurality of curvature values characterizing the curvature of the candidate driving path, and wherein the spatial relationship of said each candidate driving path is represented with coordinates of a plurality of locations along the candidate driving path.

3. The method of claim 1, wherein selecting the target driving path comprises:
computing a plurality of evaluation metrics, wherein each evaluation metric of the plurality of evaluation metrics (i) is computed using the curvature and the spatial relationship of a respective candidate driving path of the plurality of candidate driving paths, and (ii) favors lower curvature values over higher curvature values; and
selecting the target driving path based on the plurality of evaluation metrics.

4. The method of claim 3, wherein each evaluation metric of the plurality of evaluation metrics further favors candidate driving paths in which the vehicle maintains a predetermined distance from each of the one or more road primitives.

5. The method of claim 1, wherein selecting the target driving path comprises:
using a machine learning model (MLM) to compute a plurality of evaluation scores, wherein each of the plurality of evaluation scores is computed based on at least the curvature and the spatial relationship of a corresponding candidate driving path of the plurality of candidate driving paths, and
selecting the target driving path using the plurality of evaluation scores.

6. The method of claim 1, wherein the one or more road primitives comprise a lane positioning marker.

7. The method of claim 1, wherein said each candidate driving path of the plurality of candidate driving paths comprises a plurality of connection line segments represented by at least one of a polyline representation or a polynomial curve.

8. The method of claim 1, wherein identifying the plurality of target destinations comprises:
processing the perception data using a first machine learning model (MLM) to obtain one or more feature vectors characterizing geometry of the driving environment of the vehicle; and
processing the one or more feature vectors using a second MLM to identify the plurality of target destinations.

9. The method of claim 8, wherein determining the plurality of candidate driving paths comprises:
processing the one or more feature vectors and the plurality of target destinations using a third MLM.

10. The method of claim 8, wherein at least one of the first MLM or the second MLM comprises a graph neural network (GNN).

11. The method of claim 1, wherein the perception data further indicates a flow of traffic within the driving environment of the vehicle, and wherein selecting the target driving path is further based on the flow of traffic within the driving environment.

12. The method of claim 1, further comprising:
updating, using the selected target driving path, road map information accessible to the vehicle.

13. A system comprising:
a sensing system of a vehicle configured to:
obtain perception data indicative of (i) one or more road primitives in a driving environment of the vehicle, (ii) a first configuration of a plurality of driving lanes at a first range of distances from the vehicle, and (iii) a second configuration of the plurality of driving lanes at a second range of distances from the vehicle, the second range being longer than the first range; and
a data processing system configured to:
determine, based on the perception data, a correspondence of the first configuration of the plurality of driving lanes to the second configuration of the plurality of driving lanes, wherein to determine the correspondence, the data processing system is configured to:
identify a plurality of target destinations, each of the plurality of target destinations identified for a corresponding driving lane of the second configuration of the plurality of driving lanes;
evaluate a plurality of candidate driving paths, wherein each candidate driving path of the plurality of candidate driving paths connects a starting location in a starting driving lane of the plurality of driving lanes with a respective target destination, of the plurality of target destinations, identified for a corresponding driving lane of the second configuration of the plurality of driving lanes, and wherein said each candidate driving path is evaluated in view of (i) a curvature of the candidate driving path and (ii) a spatial relationship of the candidate driving path to the one or more road primitives located between the first range of distances and the second range of distances; and
select, based on the evaluation of the plurality of candidate driving paths, a target driving path from the plurality of candidate driving paths; and
cause a motion of the vehicle to be modified based on the determined correspondence.

14. The system of claim 13, wherein the curvature of said each candidate driving path is represented with a plurality of curvature values characterizing the curvature of the candidate driving path, and wherein the spatial relationship of said each candidate driving path is represented with coordinates of a plurality of locations along the candidate driving path.

15. The system of claim 13, wherein to select the target driving path, the data processing system is configured to:
compute a plurality of evaluation metrics, wherein each evaluation metric of the plurality of evaluation metrics (i) is computed using the curvature and the spatial relationship of a respective candidate driving path of the plurality of candidate driving paths, and (ii) favors lower curvature values over higher curvature values; and
select the target driving path based on the plurality of evaluation metrics.

16. The system of claim 15, wherein each evaluation metric of the plurality of evaluation metrics further favors candidate driving paths in which the vehicle maintains a predetermined distance from each of the one or more road primitives.

17. The system of claim 13, wherein the one or more road primitives comprise a lane positioning marker.

18. The system of claim 13, wherein to identify the plurality of target destinations, the data processing system is configured to:
process the perception data using a first machine learning model (MLM) to obtain one or more feature vectors characterizing geometry of the driving environment of the vehicle; and process the one or more feature vectors using a second MLM to identify the plurality of target destinations.

19. The system of claim 18, wherein to determine the plurality of candidate driving paths, the data processing system is configured to:

process the one or more feature vectors and the plurality of target destinations using a third MLM.

20. The system of claim 13, wherein the data processing system is further configured to:

update, using the selected target driving path, road map information accessible to the vehicle.

21. A non-transitory computer-readable storage medium storing instructions that, when executed by a processing device, cause the processing device to perform operations comprising:

receiving perception data from a sensing system of a vehicle, the perception data indicative of (i) one or more road primitives in a driving environment of the vehicle, (ii) a first configuration of a plurality of driving lanes at a first range of distances from the vehicle, and (iii) a second configuration of the plurality of driving lanes at a second range of distances from the vehicle, the second range being longer than the first range;

determining, based on the perception data, a correspondence of the first configuration of the plurality of driving lanes to the second configuration of the plurality of driving lanes, wherein determining the correspondence comprises:

identifying a plurality of target destinations, each of the plurality of target destinations identified for a corresponding driving lane of the plurality of driving lanes;

evaluate a plurality of candidate driving paths, wherein each candidate driving path of the plurality of candidate driving paths connects a starting location in a starting driving lane of the plurality of driving lanes with a respective target destination, of the plurality of target destinations, identified for a corresponding driving lane of the second configuration of the plurality of driving lanes, and wherein said each candidate driving path is evaluated in view of (i) a curvature of the candidate driving path and (ii) a spatial relationship of the candidate driving path to the one or more road primitives located between the first range of distances and the second range of distances; and selecting, based on the evaluation of the plurality of candidate driving paths, a target driving path from the plurality of candidate driving paths; and causing a motion of the vehicle to be modified based on the determined correspondence.

\* \* \* \* \*